US006995945B2

(12) United States Patent
Kohso et al.

(10) Patent No.: US 6,995,945 B2
(45) Date of Patent: Feb. 7, 2006

(54) HEAD POSITIONING SYSTEM, DISK DRIVE APPARATUS USING THE SAME, AND HEAD POSITIONING METHOD

(75) Inventors: Hiroshi Kohso, Osaka (JP); Toshio Inaji, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 176 days.

(21) Appl. No.: 10/694,445

(22) Filed: Oct. 28, 2003

(65) Prior Publication Data
US 2004/0136110 A1    Jul. 15, 2004

(30) Foreign Application Priority Data
Oct. 28, 2002   (JP)  .............................. 2002-312442

(51) Int. Cl.
*G11B 5/596*    (2006.01)
(52) U.S. Cl. ............................... 360/78.06; 360/78.09; 360/77.02; 318/632; 318/567
(58) Field of Classification Search ..................... None
See application file for complete search history.

(56) References Cited

U.S. PATENT DOCUMENTS 5,710,497 A * 1/1998 Yanagimachi ............... 318/632

2003/0048571 A1 * 3/2003 Soyama et al. .......... 360/78.06

FOREIGN PATENT DOCUMENTS

| JP | 10-172229    | 6/1998 |
| JP | 11-25626     | 1/1999 |
| JP | P2000-163901 | 6/2000 |
| JP | P2002-42434  | 2/2002 |

* cited by examiner

*Primary Examiner*—Andrew L. Sniezek
(74) *Attorney, Agent, or Firm*—McDermott Will & Emery LLP

(57) ABSTRACT

A head positioning system includes: a positioning mechanism section 1 for positioning a head 12; a position controller 2 for detecting a head position signal x to output a position control signal $U_x$; a velocity detector 3 for detecting the relative velocity of the head 12 with respect to a disk 7 based on the head position signal x; a counter electromotive voltage detector 4 for outputting an estimated head velocity signal $V_{e2}$ that is obtained by estimating the absolute velocity of the head 12 based on a counter electromotive voltage signal $V_s$ of an actuator 50; an estimated velocity corrector 5 for correcting an estimation error of the estimated head velocity signal $V_{e2}$ based on a velocity signal detected from the head position signal x so as to output a corrected estimated velocity signal $V_{e2}'$; and an estimation controller 6 for outputting a velocity control signal $U_v$ based on the corrected estimated velocity signal $V_{e2}'$, wherein the actuator 50 is controlled by a control amount signal U that is obtained by adding at least the velocity control signal $U_v$ to the position control signal $U_x$.

10 Claims, 19 Drawing Sheets

HEAD POSITIONING SYSTEM, DISK DRIVE APPARATUS USING THE SAME, AND HEAD POSITIONING METHOD

BACKGROUND OF THE INVENTION

1. Field of the Invention

The present invention relates to a disk drive apparatus for use with a disk-shaped information recording medium, such as a magnetic disk drive apparatus, an optical disk drive apparatus, or the like, a head positioning system of the disk drive apparatus, and a head positioning method for the disk drive apparatus.

2. Description of the Prior Art

In recent years, a demand of the market for a high recording density disk drive apparatus, in/from which a large amount of data, such as video information, sound information, character information, or the like, are stored/read at a high speed, has been increasing along with the progress of multimedia industries. Among various disk drive apparatuses, a magnetic disk drive apparatus is small and less expensive but has a large capacity, and is capable of high speed data transfer. Applications of such a magnetic disk drive apparatus have been increasing not only in uses for personal computers (PCs), but also in the AV (Audio-Visual) industry and car electronics industry. Moreover, the need for magnetic disk drive apparatuses in the so-called mobile communication industry typified by terminal devices for mobile communication has been increasing, and therefore, a further reduction in size of magnetic disk drive apparatuses has been demanded. Among applications other than the applications to PCs, the other advantages of magnetic disk drive apparatuses, i.e., small size, small power consumption, and vibration/impact resistance, as well as high density (large capacity), are considered to be important. Thus, a demand for precise and quick positioning of a head to a target position has become more stringent along with an increase in the recording density.

In general, a positioning mechanism using an actuator is used as means for positioning a head of a disk drive apparatus on a recording medium. Generally known positioning mechanisms are a linear actuator and a rotary actuator. Both the linear actuator and the rotary actuator are guided by a ball and roller bearing. However, when the actuator is driven for moving a head supporting mechanism with such a bearing, friction force which is a force against the movement of the head supporting mechanism always occurs in the bearing. For example, when the head supporting mechanism starts to drive, the actuator must have a driving force that exceeds the friction force resulting from the static friction between the bearing and the head supporting mechanism. After the movement of the head supporting mechanism is started, the friction force resulting from the kinetic friction occurs between the bearing and the head supporting mechanism. In general, when a movable part like such a head supporting mechanism is moved, the static friction is larger than the kinetic friction. Thus, when the movement of the head supporting mechanism is started, a larger driving power is required. Thus, in a mechanism that moves using a bearing, smooth movement is difficult to achieve because of the difference between the static friction and the kinetic friction, and the servo control for positioning the head supporting mechanism may not be precisely performed.

Furthermore, as the size of the disk drive apparatus is decreased, the size of the bearing is accordingly decreased, so that the influence of such friction forces on the movement of the head supporting mechanism becomes larger. Furthermore, the size and weight of the head supporting mechanism are also decreased, and therefore, reaction force caused by a flexible print circuit (FPC), which is connected to a head and transfers an electric signal thereto, largely influences the movement of the head supporting mechanism as well as the friction force. Thus, as the size of the disk drive apparatus is decreased, the friction force in the bearing, the reaction force by the FPC, and actuator vibration produced by the spindle vibration caused due to rotation of a disk is more likely to adversely influence the performance of the disk drive apparatus.

In magnetic disk drive apparatuses, or the like, position information are written in advance on a disk in many cases, but the signals obtained from the position information are discrete signals. Moreover, the number of pieces of position information is limited because sufficient data regions should be secured for writing new information on the disk. In a small size disk drive apparatus, there is a limit to an increase in the number of revolutions due to restrictions on the system specifications. Thus, it is impossible to sufficiently increase the sampling frequency. As a result, the increase of the control frequency is restricted. This also can be a factor that adversely influences the reduction in size and increase in recording density of the disk drive apparatus.

As the size of the disk is reduced and the recording density of the apparatus is increased, the friction in the bearing more largely influences the control of the driving operation of the positioning system with the actuator. This influence is not negligible in the positioning of the head. Conventionally, against such various factors that cause a decrease in the positioning precision, the following countermeasures have been proposed: (1) a mechanism for reducing disturbance such as friction; (2) a method for estimating and compensating for friction and disturbance vibration by an observer in the control process; and (3) a method for suppressing disturbance by a high band control.

For example, as means for mechanically reducing disturbance (countermeasure (1)), a method for using a member having desirable slidability in the bearing and a method for suppressing static friction with kinetic friction have been known. As a method for estimating and compensating for friction by an observer (countermeasure (2)), the load control performed based on continuous signaling using a counter electromotive voltage signal of an actuator (VCM) has been proposed. However, in the case where the counter electromotive voltage signal is used as a control signal, a variation in the resistance value due to a variation in the coil resistance, a temperature variation, etc., influences the controllability. Thus, various correction methods have been proposed. As for the high band control for the countermeasure (3), there is an example where an acceleration sensor signal other than a discrete position signal is used.

Hereinafter, some specific propositions for the countermeasures (1) and (2) are exemplified and briefly described, while the countermeasure (3) which is not much relevant to the present invention is not herein described.

A proposed example of a method for suppressing an influence of friction (countermeasure (1)) is a method for driving a head to incessantly tremble. Specifically, the disk is incessantly wobbled with respect to a head such that a kinetic friction state always occurs between a head supporting mechanism and a bearing, whereby an influence of static friction is eliminated (see, for example, Japanese Unexamined Patent Publication No. 10-172229).

FIG. 17 illustrates an operation principle of a head positioning system of a conventional disk drive apparatus.

Specifically, FIG. 17 shows a structure of a rotation controlling mechanism which utilizes wobbling. Herein, illustration of the entire structure of the disk drive apparatus is omitted and only the rotation controlling mechanism, which is a key element of the head positioning system, is described.

In FIG. 17, a disk 311 is placed on a disk table 393 and rotates according to the rotation of a motor shaft 394. The disk 311 has a large number of tracks 396 which are concentrically formed around the center of the disk 311. The head supporting mechanism having a head mounted thereon is driven by an actuator. The head is moved over the disk 311 to a target position by controlling the actuator. The head writes/reads information on/from a track at the target position. The disk table 393 has a disk shape and has a chucking positioning section 395 at the center thereof. The chucking positioning section 395 fits in the center hole of the disk 311, thereby positioning the disk 311. A portion of the disk table 393 is provided with a counter weight 397.

In general, a disk, a disk table and a motor shaft are provided in a concentrical configuration. However, in this proposed example, the center of the disk 311, i.e., the chucking center CC, is eccentric from the central axis of the disk rotation control, i.e., the motor shaft axis CM, by an eccentric amount (distance) d as shown in FIG. 17. In such a structure, when the disk 311 is rotated, the head incessantly reciprocates (i.e., wobbles) along the radial direction of the disk 311 according to the eccentric amount d. That is, friction force resulting from kinetic friction always resides between the head supporting mechanism and the bearing, and accordingly, friction force resulting from static friction rarely occurs therebetween. Thus, the operation of moving the head mounted on the head supporting mechanism is smoothly and precisely performed, and positioning of the head is precisely realized.

Furthermore, as described above, the disk table 393 is provided with the counter weight 397. The counter weight 397 is attached on the lower surface of the disk table 393 and positioned on the opposite side to the chucking center CC with respect to the motor shaft axis CM, such that the center of gravity of the entire structure resides on the motor shaft axis CM. Thus, the vibration caused due to eccentricity when the disk 311 is rotated is suppressed. In this proposed example, the above structure suppresses an adverse influence of static friction on the head positioning operation.

As a method for estimating and compensating for disturbance by an observer (countermeasure (2)), an exemplary control method applied to the load control operation has been known, although the exemplary control method is not the control for improving the positioning precision, such as a following control (see, for example, the spec of Japanese Unexamined Patent Publication No. 11-25626). In this example, when the control is performed using a counter electromotive voltage signal of the VCM, an estimation error in the velocity estimation due to the counter electromotive voltage signal is corrected. Specifically, before the load control operation, the dynamic range of the counter electromotive voltage signal and the offset that occurs when the counter electromotive voltage signal is converted by an AD converter and input to a CPU are corrected. Then, the velocity control is performed such that the slider does not collide against the disk and the head is stably moved over the disk.

FIG. 18 shows a structure of a control operation mechanism provided in the above-described exemplary disk drive apparatus which performs the load control operation using the counter electromotive voltage signal of the VCM. FIG. 18 further shows a flow of the load control operation. In FIG. 18, the disk drive apparatus 410 includes: a VCM spindle motor driver 412 for rotating a disk 411; a magnetic head 413; an actuator 414 for guiding a head slider which has the magnetic head 413 onto the disk 411 or moving the head slider to a retreat position; a ramp 415; and a CPU/HDC 416 for performing the velocity control of the actuator 414; the calibration control for detecting the offset and dynamic range of an AD converter prior to the velocity control, the control of write/read operations, etc.

In the disk drive apparatus 410, when the magnetic head 413 is loaded from the ramp 415 on the disk 411, the velocity is estimated from the counter electromotive voltage signal of the VCM to perform the velocity control. Counter electromotive voltage detection means of the CPU/HDC 416 includes a bridge circuit for detecting as the counter electromotive voltage the voltage caused in the coil by balancing the coil resistance of the VCM with a predetermined resistance. The resistance value of the bridge circuit is balanced based on the coil resistance value obtained when the coil is at a room temperature. In the example illustrated herein, prior to the control operation, during when the head is on the ramp, a voltage that moves the actuator in the opposite direction is applied so that the head is pushed against the ramp. The dynamic range of the voltage output from the head pushed against the ramp and the offset of the AD converter are calibrated.

Furthermore, in an example of a proposed method for correcting an estimation error of the velocity estimation which is caused due to a variation in the temperature of a coil, the relationship between the velocity estimation value, which is estimated based on the counter electromotive voltage signal, and the detected voltage is corrected according to the state where an actuator is pushed against a stopper before the load control operation is performed and the state where the actuator is pushed against an inner periphery stopper before the unload control operation is performed (see, for example, Japanese Unexamined Patent Publication No. 2000-163901).

FIG. 19 is a flowchart of a control process of a disk drive apparatus that uses the above method.

In a disk drive apparatus control system of FIG. 19, a calibration operation is performed at the start of the load control operation of loading the head from the ramp onto the disk. In the calibration operation, a VCM velocity detection value, which is detected by a VCM velocity detector while the actuator is pushed against the outer periphery stopper such that the actual velocity of the VCM is zero, is read and a velocity correction value used for correcting the relationship between a VCM current value and the VCM velocity detection value is obtained based on the detected VCM velocity detection value. During the head positioning period that occurs after the loading operation, the above-described calibration operation is performed again while the actuator is pushed against the inner periphery stopper at periodic intervals counted with a timer in order to update the velocity correction value, and the head is returned to an original head position.

However, in the disk drive apparatus of FIG. 17 which utilizes wobbling, an eccentric mechanism is incorporated in the mechanical structure of the apparatus in order to suppress the influence of the static friction. Thus, there is a possibility that the influence of vibration on external elements due to the eccentric disk rotation mechanism becomes normegligible. In this proposed example, a special production method and special elements are necessary for the eccentric structure additionally to those required in a general disk drive apparatus having a non-eccentric mechanical structure.

In the proposed example of FIG. 17, the motor shaft axis CM and the chucking center CC are deviated from each other. Thus, the driven disk table and the disk are rotated in an eccentric state with respect to the rotation of the motor shaft, and accordingly, vibration that is in synchronization with the number of revolutions of the disk table and the disk is likely to occur in the entire structure of the disk drive apparatus. Such vibration produces noise to the outside and should be avoided in an appliance that uses the disk drive apparatus. Furthermore, there is a possibility that vibration occurs in a direction perpendicular to the disk. The vibration of such a direction may be a factor to cause a contact of a head with a disk in a magnetic disk drive apparatus that uses a floating magnetic head. In order to avoid such a problem, in the structure shown in FIG. 17, the counter weight is added such that the center of gravity is on the motor shaft axis CM. However, in such a method wherein the problem is solved by adjusting a balance, it is necessary to precisely adjust the weight and position of the counterweight, and the efficiency in the production process is deteriorated. Furthermore, size reduction of the disk drive apparatus requires more precise balance adjustment. Further, influence of the reaction force of the FPC is also non-negligible, and the balance of forces must be considered. In the method described in this example, vibration readily occurs due to the eccentric rotation, and therefore, suppression of the vibration is more restricted as the size of the disk drive apparatus decreases.

The exemplary structure shown in FIG. 17 is different from a generally-employed structure where the motor shaft, the disk table and the disk are placed in a concentrical configuration. Thus, in the realization of a disk drive apparatus having the conventional structure, a special mold and elements are required. Furthermore, in the production thereof, it is necessary to provide a special balance adjustment step as described above. Thus, there is a possibility that the price of a product finally increases due to the necessity for special elements and a decrease in the efficiency of the production process.

In the disk drive apparatus whose general structure is illustrated in FIG. 18 and the disk drive apparatus whose control system process is illustrated in FIG. 19, the counter electromotive voltage signal is used only as a velocity feedback signal in the load control operation for loading the head. In these disk drive apparatuses, if the velocity estimation value obtained from the counter electromotive voltage signal is used in the following control operation, the following three problems occur.

The first problem is that an error occurs in the estimated velocity if the same correction value is used in the load control operation and the following control operation, because the current value for the control driving is different between these operations by a factor of 10 or greater, and the resistance value of the coil changes according to the temperature characteristic of the coil resistance. In the proposed example whose general structure is illustrated in FIG. 18, the resistance value changes due to a variation in the temperature even in the following control operation, and the correction value used in the operation must be corrected. In the proposed example whose control system process is illustrated in FIG. 19, the load control operation and the unload control operation are only referred to, but influence of the coil resistance in the other control operations is not discussed.

The second problem is that the following control operation is a head positioning operation for controlling the head so as to follow a servo track written in advance on the disk, and the velocity signal used in this operation for velocity feedback control must be a signal that represents the relative velocity of the head with respect to the disk. However, the velocity signal obtained from the counter electromotive voltage signal is a signal that represents the absolute velocity, and therefore, the above-described conventional load control operation is a velocity control operation based on the absolute velocity of the head. Thus, since the conventional control operation is performed based on only the absolute velocity without considering the relative velocity, the velocity feedback that intends to increase the stability involves an error in the conventional control operation. No prior art technique provides a countermeasure to these problems. Further, if the absolute velocity is used in the feedback control operation, the head stops at a target position after it reaches there. Therefore, if a disk track has minute meanders, the head cannot follow the meanders. As a result, a position error is likely to occur.

The third problem is that, when the force disturbance exerted on the actuator is estimated and compensated for based on the velocity signal by an observer, if the relative velocity of the head with respect to the disk is not used, the operation of controlling the head so as to follow tracks in the positioning control itself results in a disturbance vibration. Thus, force disturbance estimation/compensation operation may deteriorate the positioning precision.

The present invention was conceived in view of the above problems. An objective of the present invention is to stably perform positioning of a head without being adversely influenced by friction force resulting from static friction, spindle vibration, or the like.

SUMMARY OF THE INVENTION

A head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal; a velocity detector for receiving the head position signal, and detecting or estimating a relative velocity of the head with respect to the information recording medium to output a relative velocity signal that indicates a relative velocity of the head; a counter electromotive voltage detector for detecting a counter electromotive voltage signal of the voice coil motor of the actuator, and estimating an absolute velocity of the head based on the counter electromotive voltage signal to output an estimated head velocity signal; an estimated velocity corrector for correcting an estimation error of the estimated head velocity signal based on the relative velocity signal to output a corrected estimated velocity signal; and an estimation controller for outputting a velocity control signal based on the corrected estimated velocity signal, wherein the actuator is controlled by a control amount signal that is obtained by adding together at least the position control signal and the velocity control signal.

Another head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal; a velocity detector for receiving the head position signal, detecting a relative velocity of the head with respect to the information recording medium, and estimating the relative head velocity to output a detected velocity signal that indicates a detected value of the relative head velocity and an estimated velocity signal that indicates an estimated value of the relative head velocity; a velocity signal switch for receiving the detected velocity signal and the estimated velocity signal and selectively outputting any one of the detected velocity signal and the estimated velocity signal as a relative velocity signal; a counter electromotive voltage detector for detecting a counter electromotive voltage signal of the voice coil motor of the actuator, and estimating an absolute velocity of the head based on the counter electromotive voltage signal to output an estimated head velocity signal; an estimated velocity corrector for correcting an estimation error of the estimated head velocity signal based on the relative velocity signal to output a corrected estimated velocity signal; and an estimation controller for outputting a velocity control signal based on the corrected estimated velocity signal, wherein the actuator is controlled by a control amount signal that is obtained by adding together at least the position control signal and the velocity control signal.

Still another head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal; a counter electromotive voltage detector for detecting a counter electromotive voltage signal of the voice coil motor of the actuator, estimating an absolute velocity of the head based on the counter electromotive voltage signal to output an estimated head velocity signal, and estimating the position of the head by integrating the estimated head velocity signal to output an estimated head position signal; an estimated velocity corrector for correcting an estimation error of the estimated head velocity signal based on a difference between the head position signal and the estimated head position signal to output a corrected estimated velocity signal; and an estimation controller for outputting a velocity control signal based on the corrected estimated velocity signal, wherein the actuator is controlled by a control amount signal that is obtained by adding together at least the position control signal and the velocity control signal.

Still another head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal; a velocity detector for receiving the head position signal, and detecting or estimating a relative velocity of the head with respect to the information recording medium to output a relative velocity signal that indicates a relative velocity of the head; a counter electromotive voltage detector for detecting a counter electromotive voltage signal of the voice coil motor of the actuator, and estimating an absolute velocity of the head based on the counter electromotive voltage signal to output an estimated head velocity signal; an estimated velocity corrector for correcting an estimation error of the estimated head velocity signal based on the relative velocity signal to output a corrected estimated velocity signal; an estimated velocity signal switch for receiving the estimated head velocity signal and the corrected estimated velocity signal, and selectively outputting any one of the estimated head velocity signal and the corrected estimated velocity signal as a velocity signal; and an estimation controller for outputting a velocity control signal based on the velocity signal from the estimated velocity signal switch, wherein the actuator is controlled by a control amount signal that is obtained by adding together at least the position control signal and the velocity control signal.

Still another head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a velocity detector for receiving a head position signal which is generated by reading the servo information with the head and indicates the position of the head, and detecting or estimating a relative velocity of the head with respect to the information recording medium to output a relative velocity signal that indicates a relative velocity of the head; a counter electromotive voltage detector for detecting a counter electromotive voltage signal of the voice coil motor of the actuator, estimating an absolute velocity of the head based on the counter electromotive voltage signal to output an estimated head velocity signal, and estimating the position of the head by integrating the estimated head velocity signal to output an estimated head position signal; an estimated velocity corrector for correcting an estimation error of the estimated head velocity signal based on the relative velocity signal to output a corrected estimated velocity signal; an estimated position corrector for correcting an estimation error of the estimated head position signal based on a difference between the head position signal and the estimated head position signal to output a corrected estimated head position signal; and an estimation controller for generating a position control signal and a velocity control signal based on the corrected estimated velocity signal and the corrected estimated head position signal, wherein the actuator is controlled by a control amount signal that is obtained by adding together at least the position control signal and the velocity control signal.

The estimation controller may estimate an external disturbance based on the corrected estimated velocity signal and the control amount signal to output a force disturbance control signal; and the control amount signal may be obtained by adding together the force disturbance control signal, the velocity control signal and the position control signal.

The estimation controller may estimate an external disturbance based on the control amount signal and the velocity signal from the estimated velocity signal switch to output a force disturbance control signal; and the control amount signal may be obtained by adding together the force disturbance control signal, the velocity control signal and the position control signal.

The velocity detector and the counter electromotive voltage detector may output the relative velocity signal and the estimated head velocity signal, respectively, at periodic or non-periodic intervals; and the estimated velocity corrector may correct an estimation error of the estimated head velocity signal from the counter electromotive voltage detector based on an average of the difference or ratio between n samples of the relative velocity signal which are detected by the velocity detector and n samples of the estimated head velocity signal which are detected by the counter electromotive voltage detector (where n is a natural number).

The counter electromotive voltage detector may output the estimated head velocity signal at periodic or non-periodic intervals; and the estimated velocity corrector may correct an estimation error of the estimated head velocity signal from the counter electromotive voltage detector based on an average of the difference or ratio between n samples of the head position signal and n samples of the estimated head position signal which are detected by the counter electromotive voltage detector (where n is a natural number).

The velocity detector may assume that the disturbance is represented by a stepped waveform and estimate the disturbance based on the head position signal and the control amount signal to output an estimated disturbance signal; and the estimation controller may generate the force disturbance control signal based on the estimated disturbance signal.

The estimated velocity corrector may make a correction to an estimation error of the estimated head velocity signal at a predetermined cycle; in a cycle where the relative velocity signal is input, the estimated velocity corrector may calculate a new correction amount to make a correction to the estimation error; and in a cycle where the relative velocity signal is not input, the estimated velocity corrector may use a previous correction amount to make a correction to the estimation error.

The estimated velocity corrector may make a correction to an estimation error of the estimated head velocity signal at a predetermined cycle; in a cycle where the head position signal is input, the estimated velocity corrector may calculate a new correction amount to make a correction to the estimation error; and in a cycle where the head position signal is not input, the estimated velocity corrector may use a previous correction amount to make a correction to the estimation error.

The position control signal may be a discrete signal; and the velocity control signal and the force disturbance control signal may be continuous signals which vary during the time when the position control signal takes a constant value or discrete signals whose frequencies are higher than that of the position control signal.

The velocity detector may detect or estimate the velocity of the head at a predetermined sampling cycle; and the estimated velocity corrector may correct an estimation error of the estimated head velocity signal at a cycle equal to or shorter than a ½ of the sampling cycle.

The counter electromotive voltage detector may have an analog-digital converter whose dynamic range is freely switchable or a plurality of analog-digital converters having different dynamic ranges; and the counter electromotive voltage detector may switch the dynamic range according to a control operation mode of the head.

Still another head positioning system of the present invention is a head positioning system for positioning a head, which at least reads information from a rotating disk-shaped information recording medium containing at least servo information, to a target head position on the information recording medium, the head positioning system comprising: an actuator including a voice coil motor for moving the head; a position controller for receiving a head position signal which is generated by reading the servo information with the head and indicates the position of the head and a target head position signal which indicates the target head position, generating a position error signal that is a difference between the head position signal and the target head position signal, outputting a position control signal based on the position error signal, and outputting a position error integration control signal obtained by integrating the position error signal; a velocity detector for receiving the head position signal, and detecting or estimating a relative velocity of the head with respect to the information recording medium to output a relative velocity signal that indicates a relative velocity of the head; a counter electromotive voltage detector for detecting a counter electromotive voltage signal of the voice coil motor of the actuator, and estimating an absolute velocity of the head based on the counter electromotive voltage signal to output an estimated head velocity signal; an estimated velocity corrector for correcting an estimation error of the estimated head velocity signal based on the relative velocity signal to output a corrected estimated velocity signal; and an estimation controller for outputting a velocity control signal based on the corrected estimated velocity signal, wherein the actuator is controlled by a control amount signal that is obtained by adding together the position control signal, the position error integration control signal and the velocity control signal.

A disk drive apparatus of the present invention comprises: a disk-shaped information recording medium containing at least servo information; a rotation control mechanism for rotating the information recording medium; a head for at least reading information from the information recording medium; and any of the above-described head positioning systems.

A head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of generating, from a head position signal which is generated by reading the servo information with the head and indicates the position of the head and a target head position signal which indicates the target head position, a position error signal that is a difference between the head position signal and the target head position signal, and outputting a position control signal based on the position error signal; detecting or estimating a relative velocity of the head with respect to the information recording medium based on the head position signal to output a relative velocity signal that indicates a relative velocity of the head; detecting a counter electromotive voltage signal of the voice coil motor of the actuator, and estimating an absolute velocity of the head based on the counter electromotive voltage signal to output an estimated head velocity signal; correcting an estimation error of the estimated head velocity signal based on the relative velocity signal to output a corrected estimated velocity signal; outputting a velocity control signal based on the corrected estimated velocity signal; and controlling the actuator by a control amount signal that is obtained by adding together at least the position control signal and the velocity control signal.

Another head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of: generating, from a head position signal which is generated by reading the servo information with the head and indicates the position of the head and a target head position signal which indicates the target head position, a position error signal that is a difference between the head position signal and the target head position signal, and outputting a position control signal based on the position error signal; detecting a relative velocity of the head with respect to the information recording medium and estimating the relative head velocity based on the head position signal to output a detected velocity signal that indicates a detected value of the relative head velocity and an estimated velocity signal that indicates an estimated value of the relative head velocity; selectively outputting any one of the detected velocity signal and the estimated velocity signal as a relative velocity signal; detecting a counter electromotive voltage signal of the voice coil motor of the actuator, and estimating an absolute velocity of the head based on the counter electromotive voltage signal to output an estimated head velocity signal; correcting an estimation error of the estimated head velocity signal based on the relative velocity signal to output a corrected estimated velocity signal; outputting a velocity control signal based on the corrected estimated velocity signal; and controlling the actuator by a control amount signal that is obtained by adding together at least the position control signal and the velocity control signal.

Still another head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of: generating, from a head position signal which is generated by reading the servo information with the head and indicates the position of the head and a target head position signal which indicates the target head position, a position error signal that is a difference between the head position signal and the target head position signal, and outputting a position control signal based on the position error signal; detecting a counter electromotive voltage signal of the voice coil motor of the actuator, estimating an absolute velocity of the head based on the counter electromotive voltage signal to output an estimated head velocity signal, and estimating the position of the head by integrating the estimated head velocity signal to output an estimated head position signal; correcting an estimation error of the estimated head velocity signal based on a difference between the head position signal and the estimated head position signal to output a corrected estimated velocity signal; outputting a velocity control signal based on the corrected estimated velocity signal; and controlling the actuator by a control amount signal that is obtained by adding together at least the position control signal and the velocity control signal.

Still another head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of: generating, from a head position signal which is generated by reading the servo information with the head and indicates the position of the head and a target head position signal which indicates the target head position, a position error signal that is a difference between the head position signal and the target head position signal, and outputting a position control signal based on the position error signal; detecting or estimating a relative velocity of the head with respect to the information recording medium based on the head position signal to output a relative velocity signal that indicates a relative velocity of the head; detecting a counter electromotive voltage signal of the voice coil motor of the actuator, and estimating an absolute velocity of the head based on the counter electromotive voltage signal to output an estimated head velocity signal; correcting an estimation error of the estimated head velocity signal based on the relative velocity signal to output a corrected estimated velocity signal; selectively outputting any one of the estimated head velocity signal and the corrected estimated velocity signal as a velocity signal; outputting a velocity control signal based on the velocity signal; and controlling the actuator by a control amount signal that is obtained by adding together at least the position control signal and the velocity control signal.

Still another head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of detecting or estimating, based on a head position signal which is generated by reading the servo information with the head and indicates the position of the head, a relative velocity of the head with respect to the information recording medium to output a relative velocity signal that indicates a relative velocity of the head; detecting a counter electromotive voltage signal of the voice coil motor of the actuator, estimating an absolute velocity of the head based on the counter electromotive voltage signal to output an estimated head velocity signal, and estimating the position of the head by integrating the estimated head velocity signal to output an estimated head position signal; correcting an estimation error of the estimated head velocity signal based on the relative velocity signal to output a corrected estimated velocity signal; correcting an estimation error of the estimated head position signal based on a difference between the head position signal and the estimated head position signal to output a corrected estimated head position signal; generating a position control signal and a velocity control signal based on the corrected estimated velocity signal and the corrected estimated head position signal; and controlling the actuator by a control amount signal that is obtained by adding together at least the position control signal and the velocity control signal.

Still another head positioning method of the present invention is a head positioning method for positioning a head, which at least reads information from a rotating disk-shaped information recording medium containing at least servo information, to a target head position on the information recording medium using an actuator including a voice coil motor for moving the head, the head positioning method comprising the steps of: generating, from a head position signal which is generated by reading the servo information with the head and indicates the position of the head and a target head position signal which indicates the target head position, a position error signal that is a difference between the head position signal and the target head position signal, outputting a position control signal based on the position error signal, and outputting a position error integration control signal obtained by integrating the position error signal; detecting or estimating a relative velocity of the head with respect to the information recording medium based on the head position signal to output a relative velocity signal that indicates a relative velocity of the head; detecting a counter electromotive voltage signal of the voice coil motor of the actuator, and estimating an absolute velocity of the head based on the counter electromotive voltage signal to output an estimated head velocity signal; correcting an estimation error of the estimated head velocity signal based on the relative velocity signal to output a corrected estimated velocity signal; outputting a velocity control signal based on the corrected estimated velocity signal; and controlling the actuator by a control amount signal that is obtained by adding together the position control signal, the position error integration control signal and the velocity control signal.

In the above-described apparatuses and methods, disturbance estimation is performed in order to cancel disturbance caused by friction or vibration. Further, in the estimation of the head velocity, estimation based on a head position signal (estimation based on the relative velocity) and estimation based on a counter electromotive voltage signal of an actuator (estimation based on the absolute velocity) are combined, whereby the velocity estimation based on the counter electromotive voltage signal is performed with higher precision. Thus, the head positioning precision is increased. Furthermore, since an estimated velocity obtained based on the counter electromotive voltage signal is utilized, the control speed is improved without being limited by the sampling frequency of the head position signal. Thus, a higher control frequency is achieved.

Thus, as described above, according to the present invention, in order to suppress an influence of static friction in a bearing, an influence of spindle vibration or disturbance vibration, and the like, in the head positioning operation, friction force and bias force are estimated based on a head position signal, and vibration disturbance is estimated based on an estimated head velocity signal obtained from a counter electromotive voltage of an actuator. Moreover, the estimated head velocity signal which is obtained based on the counter electromotive voltage is corrected with an estimated velocity signal which is obtained based on the head position signal, whereby precise estimation is realized. Thus, the present invention provides an advantageous effect of achieving the positioning of the head with a stable operation without being substantially influenced by vibration and static friction.

The estimated head velocity signal estimated based on the counter electromotive voltage is a continuous signal or a signal whose cycle is shorter than that of the head position signal. Thus, the positioning of the head is performed with higher frequency.

Since occurrence of a position error due to vibration disturbance and an influence of static friction are suppressed, reduction in the size of a disk drive apparatus is promoted. Furthermore, any special production method and special production elements are not necessary. Therefore, the increase in the apparatus price which may be caused by a new control process is suppressed.

DESCRIPTION OF THE PREFERRED EMBODIMENTS

Hereinafter, a head positioning system and a disk drive apparatus according to the present invention are described with reference to the drawings.

(Embodiment 1)

Figure 1:
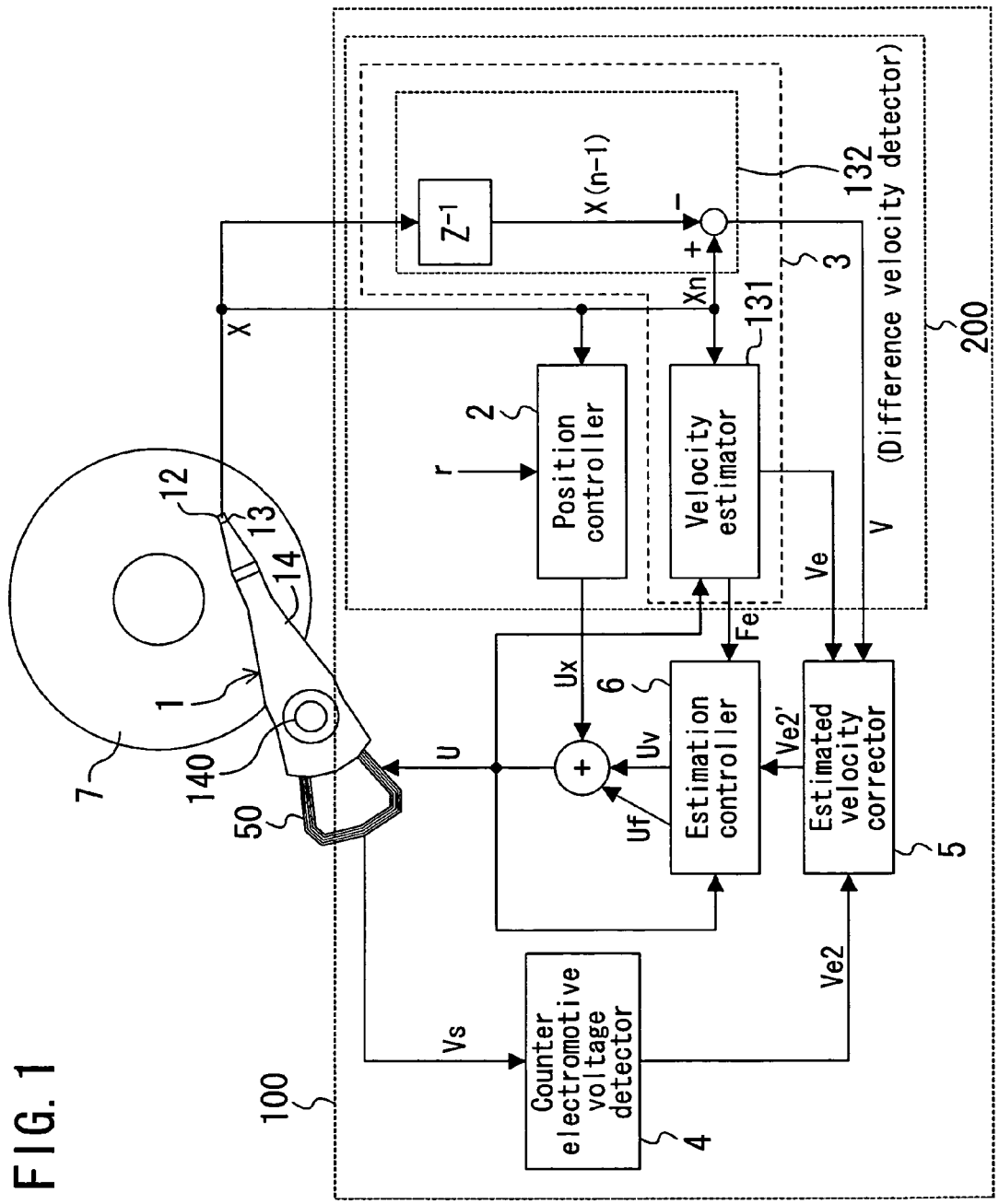
FIG. 1 is a block diagram showing the structure of a head positioning system according to embodiment 1 of the present invention.

FIG. 1 is a block diagram showing the structure of a head positioning system according to embodiment 1 of the present invention.

In FIG. 1, a magnetic disk (disk-shaped information recording medium) 7, hereinafter simply referred to as "disk", is supported at its center that corresponds to the center of rotation, and rotated by a rotation control mechanism, such as a spindle motor, for example. A magnetic head 12 (hereinafter, "head 12") for writing/reading information on/from the disk 7 is integrally formed at the tip of a head slider 13. The head slider 13 is mounted at an end of a head supporting mechanism 14. The head supporting mechanism 14 is driven by an actuator 50 around a rotation shaft 140 to move the head 12. The actuator 50 has a voice coil motor (VCM) as driving means and moves the head 12 provided at the tip of the head supporting mechanism 14 using the voice coil motor. The head slider 13, the head supporting mechanism 14 and the actuator 50 constitute a positioning mechanism section 1. The positioning mechanism section 1 performs a positioning operation for the head 12, such as a seek operation for moving the head 12 to a target track including a target head position, a following operation for controlling the head 12 so as to follow the target track, and the like. The positioning mechanism section 1 is controlled by a control section 100 based on servo information read by the head 12 from the disk 7.

Next, a procedure of a positioning control operation performed by the control section 100, which is enclosed by a large dotted line box in FIG. 1, is described. The control section 100 detects a current head position signal x, which is current head position information for the head 12, and which is also a detected head position signal, based on a servo signal which is obtained by reading the servo information written in advance on the disk 7. The control section 100 includes a basic control section 200. The basic control section 200 receives the detected head position signal x and a target head position signal r.

Figure 2:
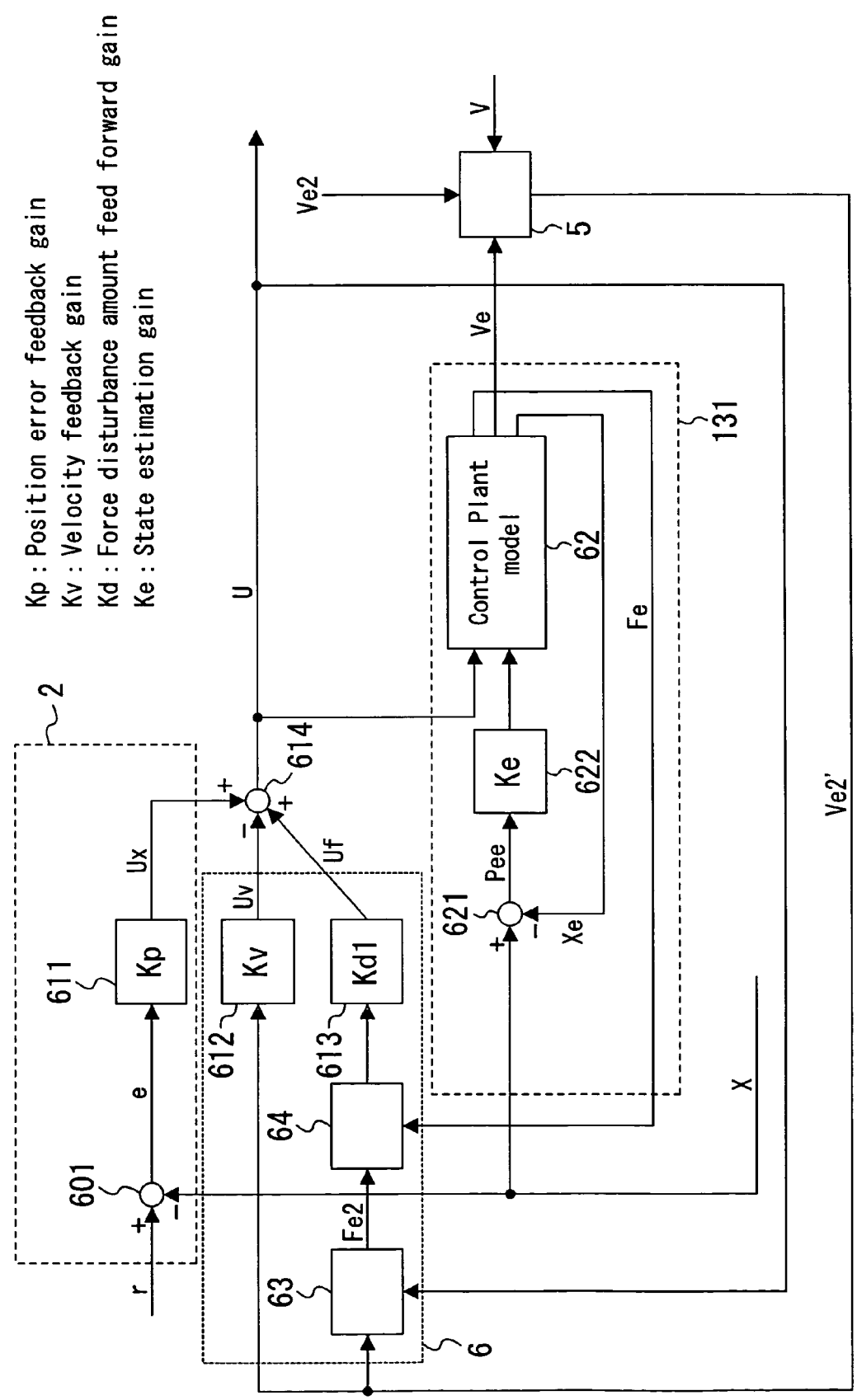
FIG. 2 is a block diagram showing the structure of a principal part of a basic control section according to embodiment 1 of the present invention.

FIG. 2 is a block diagram showing a principal part of the structure of the control section 100. In a comparator 601 of a position controller 2, the detected head position signal x is compared with the target head position signal r that represents target head position information designated in order to perform a desired positioning operation. The comparator 601 generates a position error signal e that represents a position error between the current head position of the head 12 and the target head position. The position error signal e is multiplied in a block 611 by a position error feedback gain $K_p$ to generate a position control signal $U_x$.

Referring to FIG. 1, a velocity detector 3 includes a velocity estimator 131 and a difference velocity detector 132. Referring to FIG. 2, the velocity estimator 131 includes a control plant model 62 which is obtained by modeling the positioning mechanism section 1 in the form of a mathematical formula (equation of state). The control plant model 62 receives a control amount signal U. A comparator 621 receives the current head position signal (detected head position signal) x and an estimated head position signal $x_e$ that is fed back from the control plant model 62 and outputs a signal Pee that represents the difference of the signal x and the signal $x_e$. In a block 622, the signal Pee is multiplied by gain $K_e$. A resultant signal is input from the block 622 to the control plant model 62. The control plant model 62 outputs an estimated velocity signal $V_e$ that represents an estimated velocity obtained by estimating the relative velocity of the head with respect to the disk 7. That is, the velocity estimator 131 corrects the signal Pee that represents the error between the actual control plant (i.e., the positioning mechanism section 1) and the control plant model 62. Moreover, the velocity estimator 131 estimates an influence of disturbance on the positioning mechanism section 1 based on the mathematical formula of the control plant model 62 and calculates an estimated force disturbance signal $F_e$. The estimated force disturbance signal $F_e$ is output to an adjuster 64 of an estimation controller 6.

In the estimation controller 6, an estimated force disturbance signal $F_{e2}$ is generated by a converter 63 from the control amount signal U and a corrected estimated velocity signal $V_{e2}$ (described later). The estimated force disturbance signal $F_{e2}$ is input to the adjuster 64. The adjuster 64 outputs the estimated force disturbance signal $F_e$ or a signal obtained by adding together the estimated force disturbance signal $F_e$ and the estimated force disturbance signal $F_{e2}$. The signal output from the adjuster 64 to a block 613 is multiplied by a gain $K_{d1}$ so as to generate a force disturbance control signal $U_f$. That is, the estimation controller 6 assumes a model error between the actual control plant and the control plant model 62 as disturbance and compensates for a position error due to force disturbance by using the estimated force disturbance signal $F_e$ fed back from the control plant model 62. The equation of motion from which the equation of state of the control plant model 62 is derived is represented by expression (1).

$$J\ddot{\theta} + F_d = \tau \quad (1)$$

$$s^2\theta(s) + F_d(s) = \tau(s) \quad (2)$$

$$\frac{d}{dt}\begin{pmatrix} \dot{\theta} \\ \theta \\ F_d \end{pmatrix} = \begin{pmatrix} 0 & 0 & -1/J \\ 1 & 0 & 0 \\ 0 & 0 & 0 \end{pmatrix}\begin{pmatrix} \dot{\theta} \\ \theta \\ F_d \end{pmatrix} + \begin{pmatrix} K/J \\ 0 \\ 0 \end{pmatrix}u \quad (3)$$

J: Moment of inertia
$F_d$: Disturbance
$\tau$: Output torque
K: Coefficient including torque constant Herein, assuming that the estimated force disturbance is friction force $F_d$ resulting from static friction, the disturbance $F_d$ is represented by a stepped waveform. The estimated force disturbance $F_e$ resulting from static friction can be obtained based on the control plant model 62 which is modeled based on the assumption that friction force $F_d$ has a stepped waveform.

Specifically, expression (1) is Laplace-converted to obtain expression (2). Expression (2) is converted to expression (3) which is written in the form of the equation of state. From expression (3), the velocity dθ/dt, position θ, and friction force $F_d$ are estimated. The estimation is achieved by, for example, discretizing expression (3) and performing an arithmetic operation on software.

Figure 3:
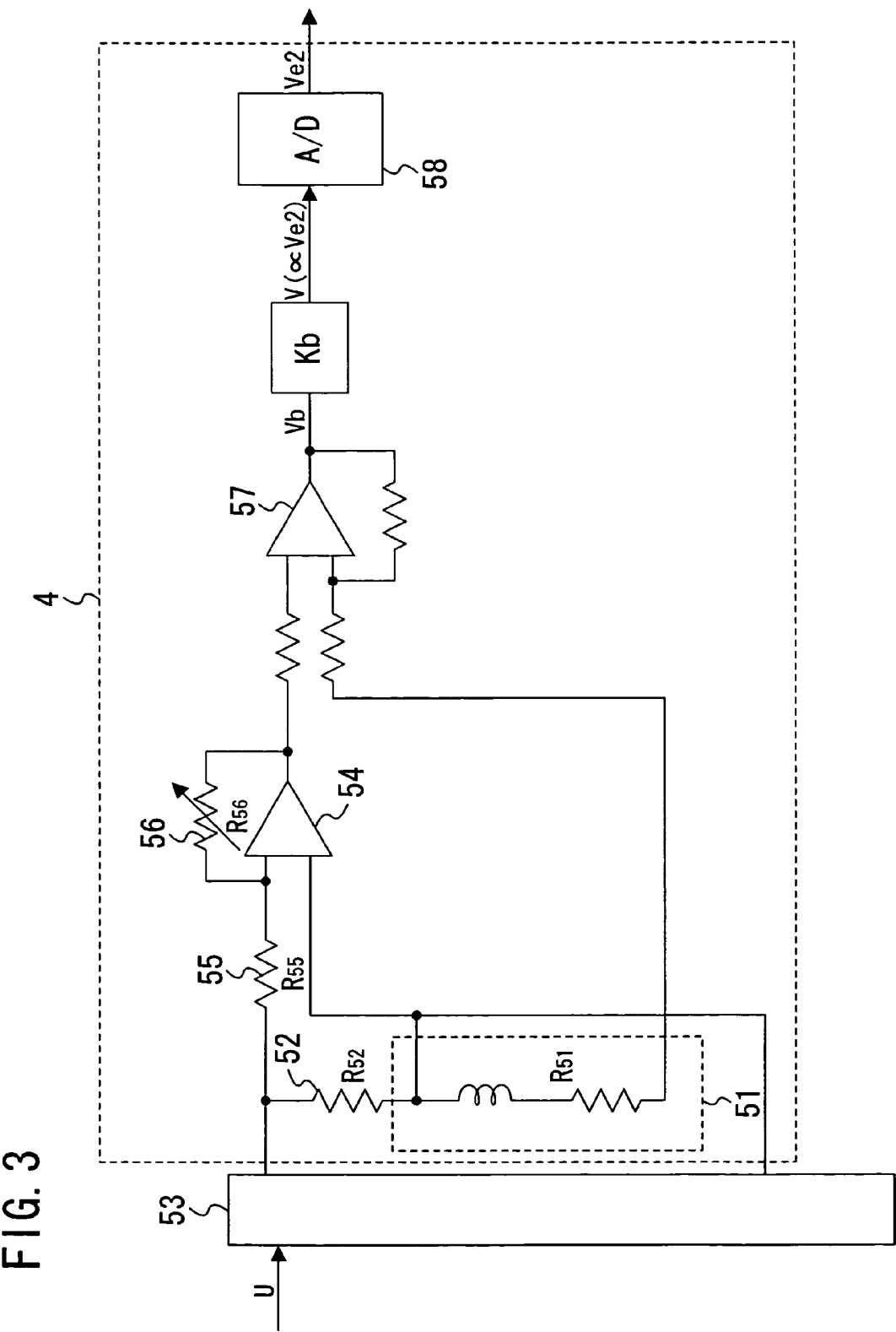
FIG. 3 is a circuit diagram showing the structure of a counter electromotive voltage detector according to embodiment 1 of the present invention.

FIG. 3 is a block diagram showing the structure of a counter electromotive voltage detector 4. In the counter electromotive voltage detector 4, a detection resistor 52 is provided in series with a coil 51 of the VCM of the actuator 50, and a voltage is applied by a driver 53 between the opposite ends of the detection resistor 52, such that a control current proportional to the control amount signal U flows through the counter electromotive voltage detector 4. A counter electromotive voltage signal $V_b$ proportional to the traveling velocity of the head (head velocity) is detected by differential amplifiers 54 and 57. The detected counter electromotive voltage signal $V_b$ is multiplied by a velocity conversion gain $K_b$ to generate a voltage signal V. The voltage signal V is proportional to the estimated head velocity signal $V_{e2}$ that is obtained by estimating the absolute velocity of the head. The voltage signal V is converted by an A/D converter 58 to the estimated head velocity signal $V_{e2}$. The resistance value $R_{56}$ of a resistor 56 provided in parallel to the differential detector 54 is adjusted such that the resistance values of the resistors 51, 52, 55, and 56 satisfy the relationship of $R_{56}/R_{55}=R_{51}/R_{52}$.

The current head position signal x is a discrete signal that is detected based on a servo signal obtained by reading servo information written in the disk 7. The estimated velocity signal $V_e$ has a value estimated from the current head position signal x and is therefore a discrete signal as is the current head position signal x. On the other hand, the estimated head velocity signal $V_{e2}$ has a value estimated from a counter electromotive voltage signal that is a continuous signal or a discrete signal whose frequency is higher than that of the estimated velocity signal $V_e$. Thus, the estimated head velocity signal $V_{e2}$ is also a continuous signal or a discrete signal whose frequency is higher than that of the estimated velocity signal $V_e$.

Referring again to FIG. 1, in an estimated velocity corrector 5 of the control section 100, the estimated head velocity signal $V_{e2}$ is corrected such that the estimated velocity signal $V_e$, which represents the relative velocity of the head 12 with respect to the disk 7, is equal to the estimated head velocity signal $V_{e2}$, which represents the absolute velocity of the head 12. This correction is performed in order to relatively position the head 12 to a track on the disk 7. That is, as a result of the correction, the head 12 is positioned so as to follow a track of the disk 7 even when the track of the disk 7 is not perfectly circular and the shape of the track includes meanders.

Figure 4:
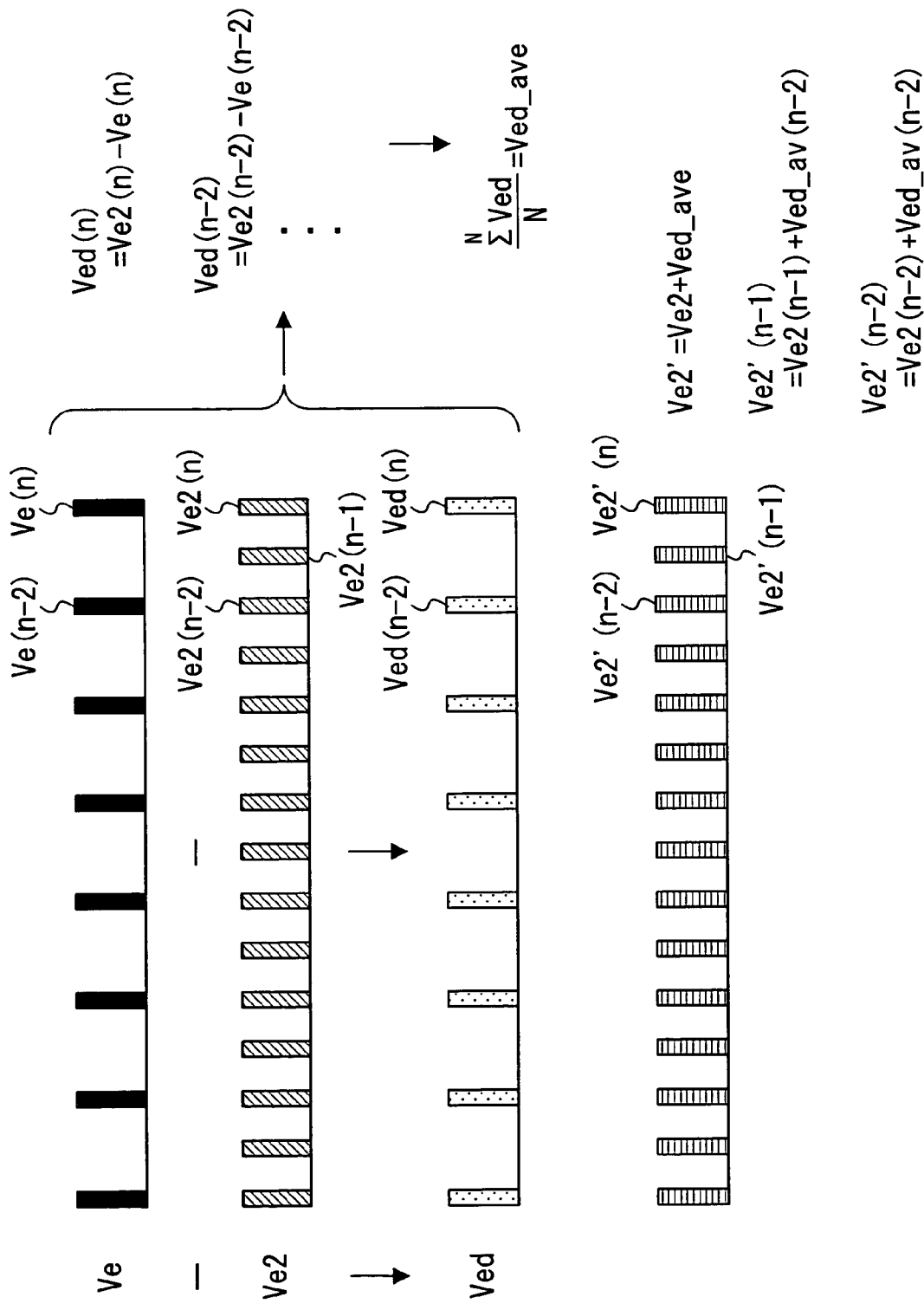
FIG. 4 illustrates an operation principle of an estimated velocity corrector according to embodiment 1 of the present invention.

FIG. 4 illustrates an operation principle of the estimated velocity corrector 5. The correction made by the estimated velocity corrector 5 is performed based on the estimated velocity of the head 12. In FIG. 4, the difference between the estimated velocity signal $V_e$ and the estimated head velocity signal $V_{e2}$ ($V_e-V_{e2}$) is calculated in the first place. This difference is calculated, for example, 10 times in total for 10 previous sample values of the estimated velocity signal $V_e$, and the average value of the 10 difference values is obtained in the form of a correction amount signal $V_{ed\_ave}$. The correction amount signal $V_{ed\_ave}$ corresponds to a difference between the estimated velocity signal $V_e$, which is obtained based on the position signal from the disk 7 and represents the relative velocity of the head 12 with respect to the disk 7, and the estimated head velocity signal $V_{e2}$, which represents the absolute velocity obtained from the counter electromotive voltage of the VCM which is detected by the counter electromotive voltage detector 4. That is, the correction amount signal $V_{ed\_ave}$ corresponds to an estimation error.

Then, the correction amount signal $V_{ed\_ave}$ is added to the estimated head velocity signal $V_{e2}$ of the current sampling cycle to obtain a corrected estimated velocity signal $V_{e2}'$. Furthermore, as shown in FIG. 4, in the sampling interval of the estimated velocity signal $V_e$ between n and (n−2), the previous correction amount signal $V_{ed}(n-2)$ is used to correct the estimated head velocity signal $Ve_2(n-1)$ to obtain a corrected estimated velocity signal $V_{e2}'(n-1)$. Note that n is a natural number. In this example, n is a natural number equal to or smaller than 10 that is the maximum number of samplings.

Figure 5:
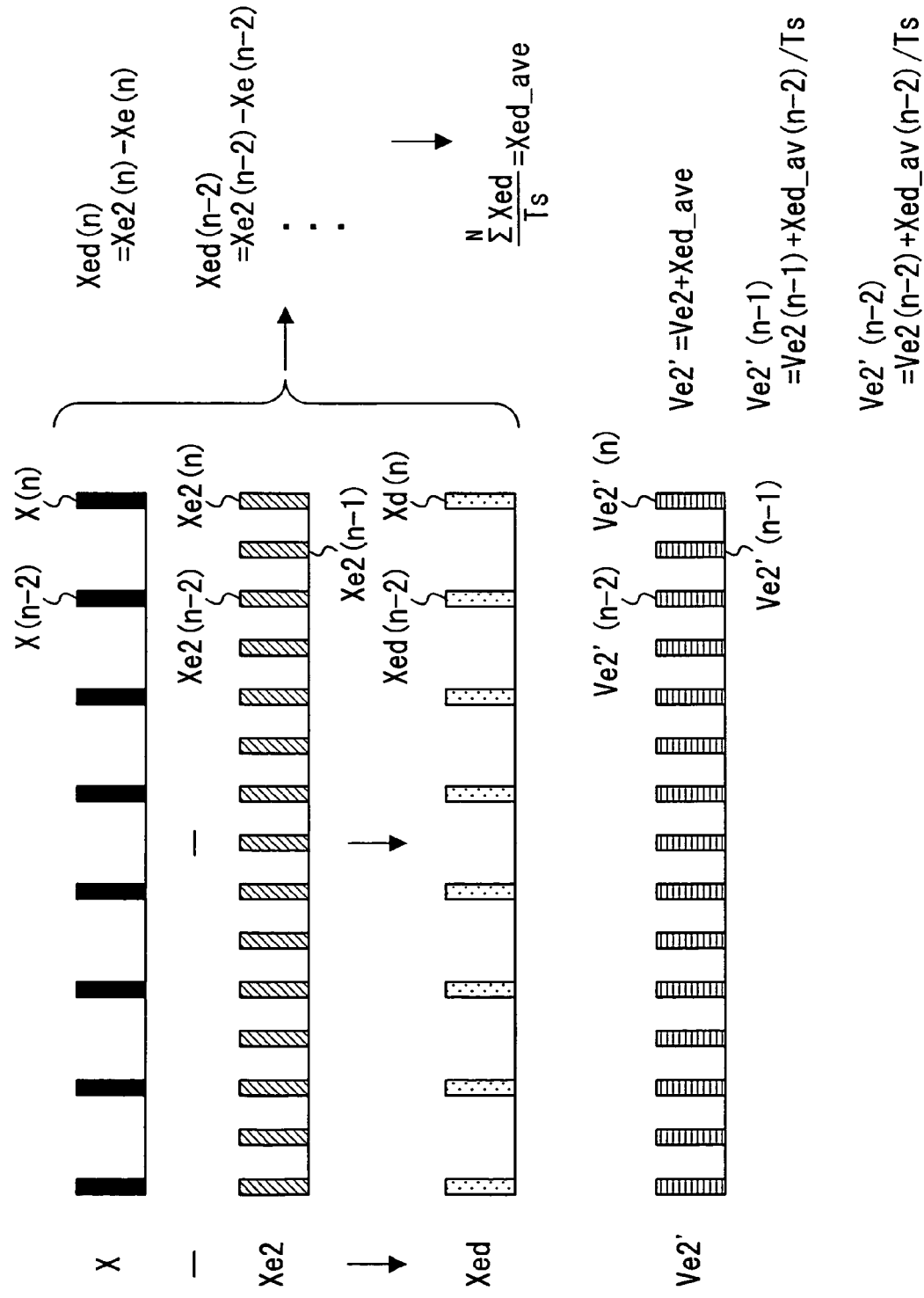
FIG. 5 illustrates another operation principle of the estimated velocity corrector according to embodiment 1 of the present invention.

FIG. 5 illustrates another operation principle of the estimated velocity corrector 5. The correction made by the estimated velocity corrector 5 is performed based on the position of the head 12. In this correction, as shown in FIG. 5, a difference between the detected head position signal x and an estimated head position signal $x_{e2}$ ($x-x_{e2}$) is calculated. The signal $x_{e2}$ has a value obtained by integrating the estimated velocity signal $V_{e2}$. This difference is calculated, for example, 10 times in total for 10 previous sample values of the estimated velocity signal $V_e$, and the average value of the 10 difference values is obtained in the form of a correction amount signal $x_{ed\_ave}$. A value $x_{ed\_ave}/T_s$, which is obtained by dividing the correction amount signal $x_{ed\_ave}$ by the sampling time $T_s$, corresponds to a difference between the estimated velocity signal $V_e$, which is obtained based on the detected head position signal x and represents the relative velocity of the head 12 with respect to the disk 7, and the estimated head velocity signal $V_{e2}$, which represents the absolute velocity obtained from the counter electromotive voltage of the VCM detected by the counter electromotive voltage detector 4. That is, the value $x_{ed\_ave}/T_s$ corresponds to an estimation error.

Then, the correction amount $x_{ed\_ave}/T_s$ is added to the estimated head velocity signal $V_{e2}$ of the current sampling cycle to obtain a corrected estimated velocity signal $V_{e2}'$. Furthermore, as shown in FIG. 5, in the sampling interval of the estimated velocity signal $V_e$ between n and (n−2), the previous correction amount signal $V_{ed}(n-2)$ is used to correct the estimated head velocity signal $V_{e2}(n-1)$ to obtain a corrected estimated velocity signal $V_{e2}'(n-1)$.

As shown in the right part of FIG. 1, the detected velocity signal v can be obtained from a difference between the detected head position $x_n(n)$ in the current sampling and the detected head position $x_n(n-1)$ in the previous sampling. The detected velocity signal v is also input to the estimated velocity corrector 5. The detected velocity signal v may be used in place of the estimated velocity signal $V_e$ to obtain the corrected estimated velocity signal $V_{e2}'$.

Next, the functions and operation of the estimation controller 6 are described with reference to FIGS. 6 through 8.

Figure 6:
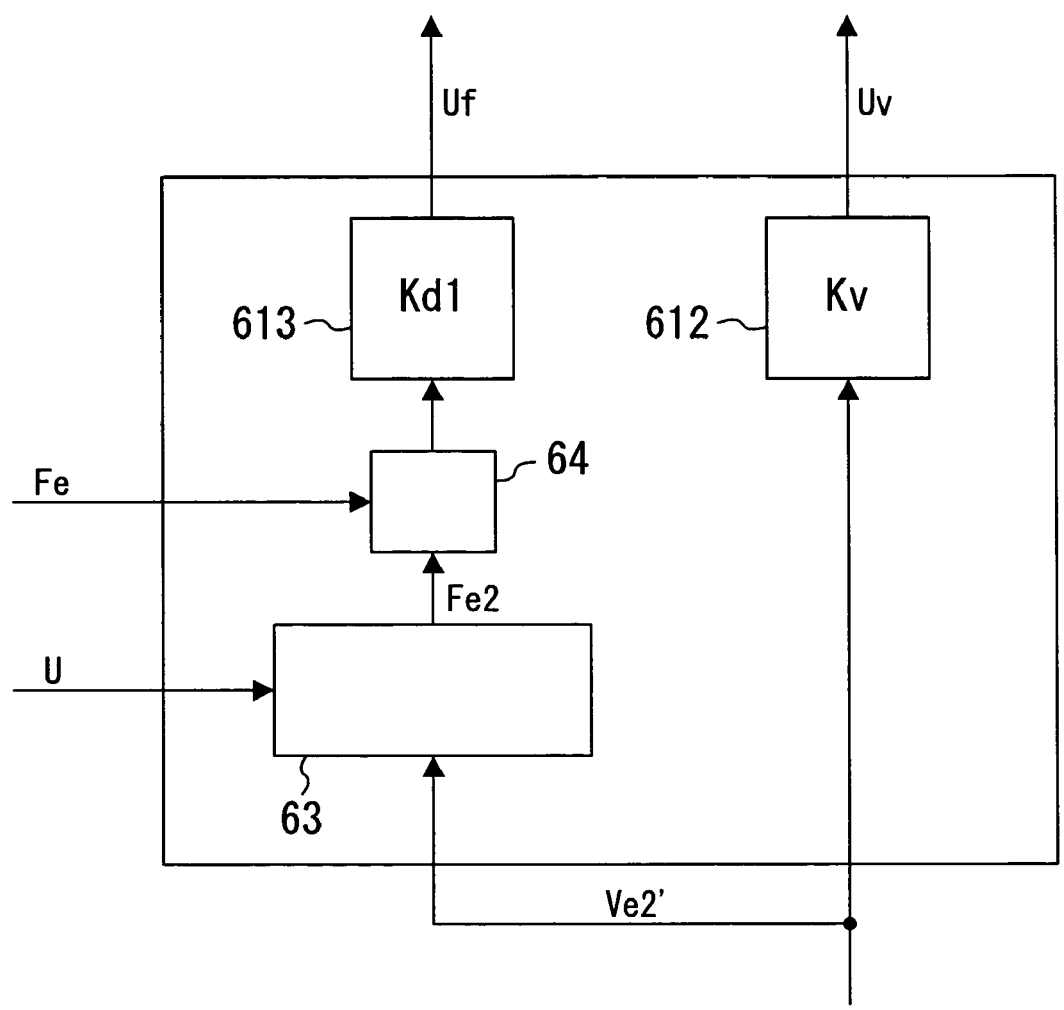
FIG. 6 is a block diagram showing the structure of an estimation controller according to embodiment 1 of the present invention.
Figure 7:
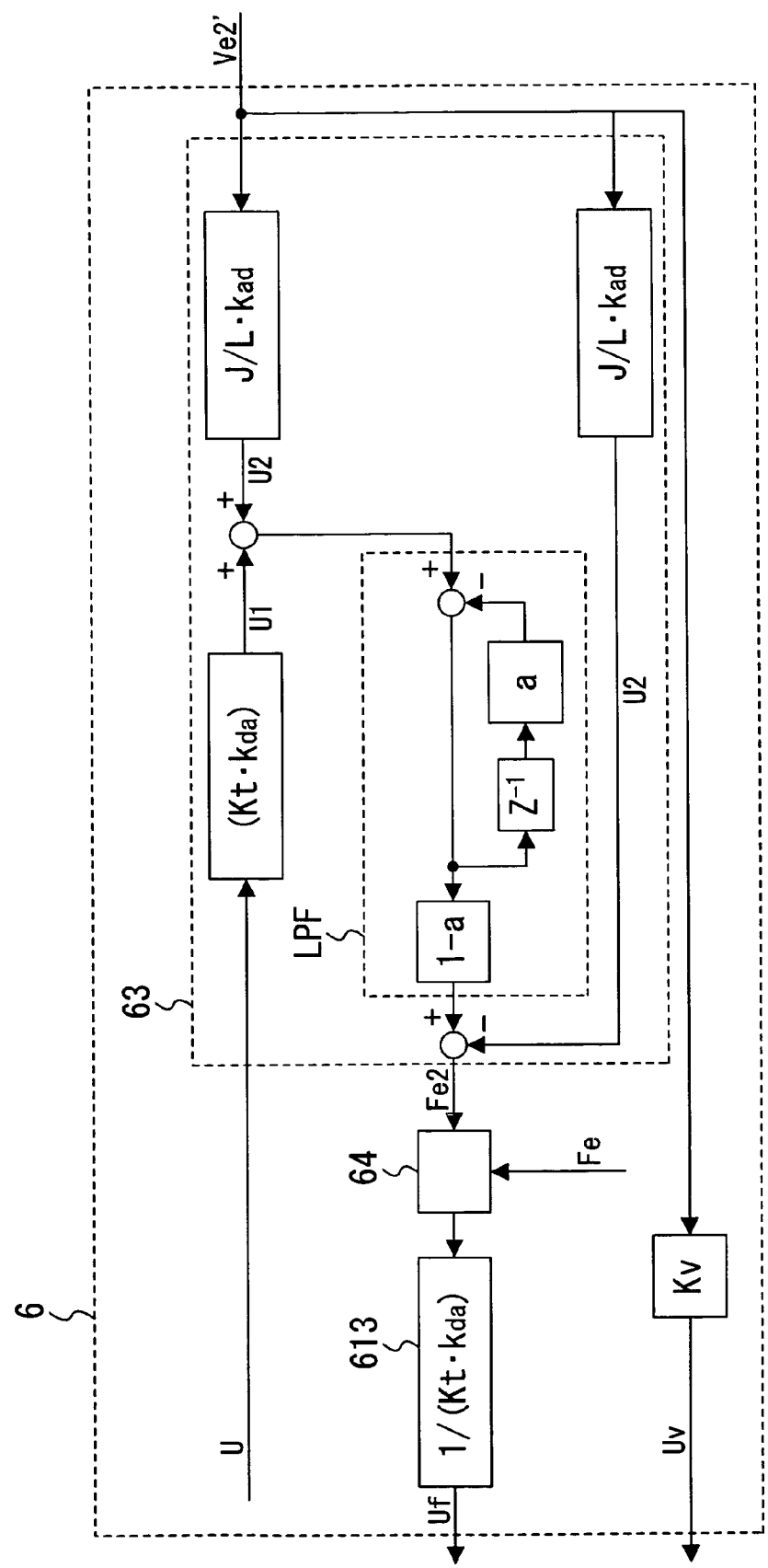
FIG. 7 is a block diagram showing details of the structure of the estimation controller according to embodiment 1 of the present invention.

FIG. 6 is a block diagram showing the structure of the estimation controller 6. The estimation controller 6 receives the corrected estimated velocity signal $V_{e2}'$, the control amount signal U, and the estimated force disturbance signal $F_e$ and outputs the force disturbance control signal $U_f$. Furthermore, the estimation controller 6 multiplies the corrected estimated velocity signal $V_{e2}'$ by a velocity feedback gain $K_v$ in the block 612 to output a velocity control signal $U_v$.

Next, a method for generating the force disturbance control signal $U_f$ from the corrected estimated velocity signal $V_{e2}'$, the control amount signal u, and the estimated force disturbance signal $F_e$, i.e., a force disturbance estimation method, is described with reference to the block diagram of FIG. 7. In FIG. 7, a broken line box 63 excluding a small broken line box LPF is a control plant model which is modeled with a mathematical expression (equation of motion).

In the first place, the control amount signal U is multiplied by a torque constant ($K_t$) of the actuator 50 and a DA conversion constant ($k_{da}$) that converts the control amount signal U to a driving current, so as to obtain a signal $U_1$ that represents the force applied to the head 12. Furthermore, the corrected estimated velocity signal $V_{e2}'$ is multiplied by the value of J/L (where J is inertia that acts on the head 12 and L is the head actuator length) and the AD conversion constant ($k_{ad}$) used for detecting a position signal so as to obtain a signal $U_2$ that represents the force actually applied to the head 12. Then, a sum signal of the two signals $U_1$ and $U_2$ is passed through a first order low pass filter LPF for stabilization, and the force $U_2$ actually applied to the head 12 is subtracted from a signal output from the low pass filter LPF, whereby the estimated force disturbance signal $F_{e2}$ that represents the estimated force disturbance applied to the positioning mechanism 1 is generated. The adjuster 64 outputs the estimated force disturbance signal $F_e$ or a signal obtained by adding together the estimated force disturbance signal $F_e$ and the estimated force disturbance signal $F_{e2}$. In a block 613, the signal obtained form the adjuster 64 is multiplied by an inverted value of the previously multiplied value of the torque constant and the inverted value of the AD conversion constant ($1/(K_t \cdot k_{da})$) so as to obtain the force disturbance control signal $U_f$.

As shown in FIG. 1, the velocity control signal $U_v$ and the force disturbance control signal $U_f$ are added to the position control signal $U_x$ so as to obtain the control amount signal U. The control amount signal U is then output to the actuator 50 of the positioning mechanism 1. The actuator 50 is driven according to the control amount signal U so that the head 12 is positioned to a target track of the disk 7.

Figure 8:
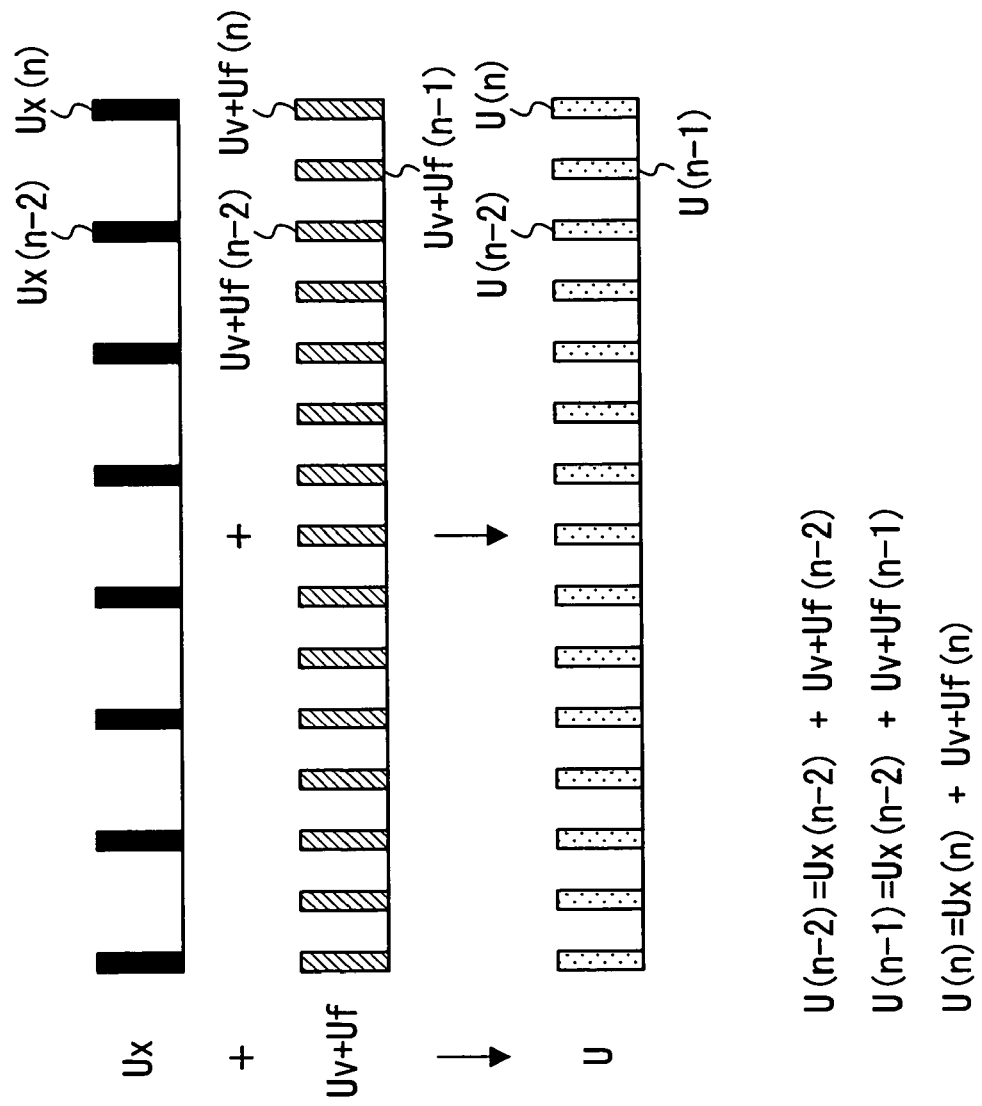
FIG. 8 illustrates an operation of the estimation controller according to embodiment 1 of the present invention.

FIG. 8 illustrates a procedure of the above-described control operation. The position control signal $U_x$, which is a discrete signal output from the position controller 2, and the two substantially continuous signals output from the estimation controller 6, i.e., the velocity control signal $U_v$ and the force disturbance control signal $U_f$, are sampled and added together, thereby obtaining ($U_x+(U_v+U_f)$) that is the control amount signal U. It should be noted that in the sampling intervals of the position control signal $U_x$ between n and (n−2), a sum of the previous position control signal $U_x$ (n−2) and ($U_v+U_f$(n−1)) is obtained, and the sum is denoted by U(n−1).

The head positioning system of the present invention operates in 5 control operation modes: (1) the load control mode for moving a head from a retreat position onto a disk; (2) the unload control mode for withdrawing the head from the disk; (3) the seek control mode for moving the head for a relatively long distance over the disk (for example, a distance exceeding two tracks); (4) the settling control mode for moving the head for a relatively short distance over the disk (for example, a distance equal to or shorter than two tracks); and (5) the following control mode for controlling the head so as to follow a target track.

Now, a method for obtaining a counter electromotive voltage signal $V_b$ in the counter electromotive voltage detector 4 based on a control voltage signal $V_s$ from the actuator 50 according to the above-described control operation modes.

Figure 9:
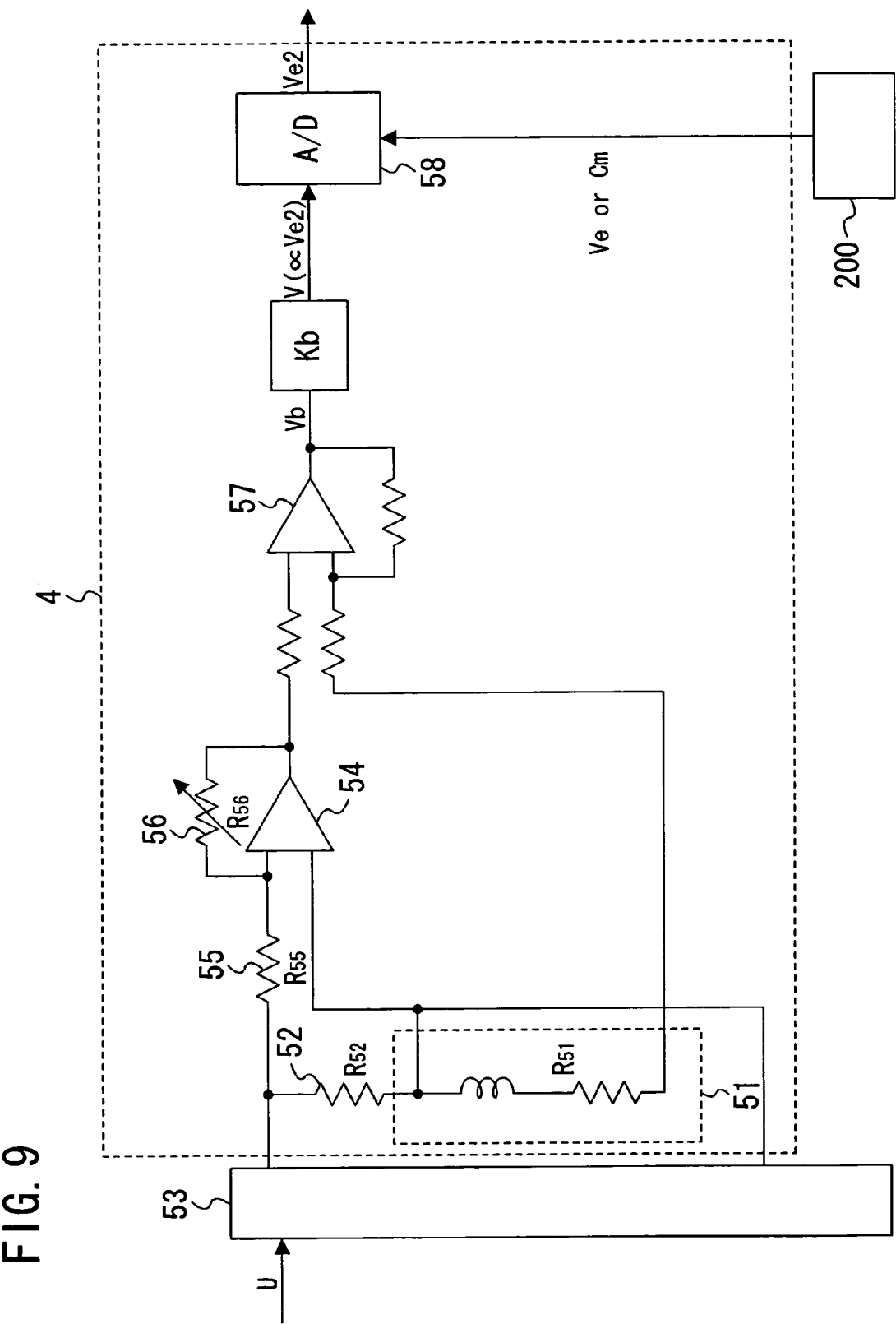
FIG. 9 is a circuit diagram showing another structure of the counter electromotive voltage detector according to embodiment 1 of the present invention.

As shown in FIG. 9, in the counter electromotive voltage detector 4, the voltage signal V, which is obtained by multiplying the counter electromotive voltage signal $V_b$ by the velocity conversion gain $K_b$, is analog-digital converted (hereinafter, "AD-converted") to obtain the estimated head velocity signal $V_{e2}$. The estimated head velocity signal $V_{e2}$ is input to the estimated velocity corrector 5. The maximum value of the AD conversion is determined by the voltage signal V that is to be AD-converted, the estimated velocity signal $V_e$, or a control mode signal $C_m$ that determines the control operation mode. For example, when the head is moved for a long distance in the seek control mode, the maximum value of the conversion is changed according to the magnitude of the detected estimated velocity signal $V_e$ or the counter electromotive voltage signal $V_b$. Alternatively, a plurality of AD-converters may be prepared (although only one AD-converter is shown in FIG. 9), and the AD-converters are switched such that the AD-conversion value has the maximum value. With the above, the optimum dynamic range is achieved, and therefore, the counter electromotive voltage signal $V_b$ is precisely detected. As a result, precise velocity estimation is achieved.

In FIG. 9, $R_{51}$ denotes the resistance value of the VCM coil. The resistance value $R_{51}$ includes a temperature-dependent parameter component as shown in the following expression and therefore changes according to the variation in temperature:

$$R_{51}=R_{VCM}+\Delta R$$

where $R_{VCM}$ is a true resistance value of the VCM coil, and $\Delta R$ is a variation of the resistance value due to a temperature variation (which corresponds to a variation in the temperature of the coil due to a variation in the atmospheric environment, the driving current, or the like).

Further, it is assumed that the detection resistance $R_{52}$ has the following relationship:

$$R_{52}=R_{55}=R_{VCM}'.$$

The variable resistance $R_{56}$ is adjusted so as to satisfy the following relationship:

$$R_{56}=R_{51}=R_{VCM}.$$

The variation due to the counter electromotive voltage of the VCM coil is detected by the differential amplifier 57. This is the above-described counter electromotive voltage signal $V_b$.

Herein, it is assumed that the counter electromotive voltage caused by $R_{VCM}$ is a true counter electromotive voltage, and the counter electromotive voltage caused by the variation $\Delta R$ in the resistance due to a temperature variation is a counter electromotive voltage signal corresponding to the error.

In the head positioning system of embodiment 1, the following control mode which is one of the five control operation modes has been mainly described, but the above-described control may be applied to the seek control mode and the settling control mode. Moreover, the above-described control is applicable to a part of the load control mode and unload control mode which is performed when the head 12 is on the disk 7. Furthermore, in a disk drive apparatus wherein the control operation modes are freely switchable, the above-described control may be used in a part of the control operation modes.

Figure 10:
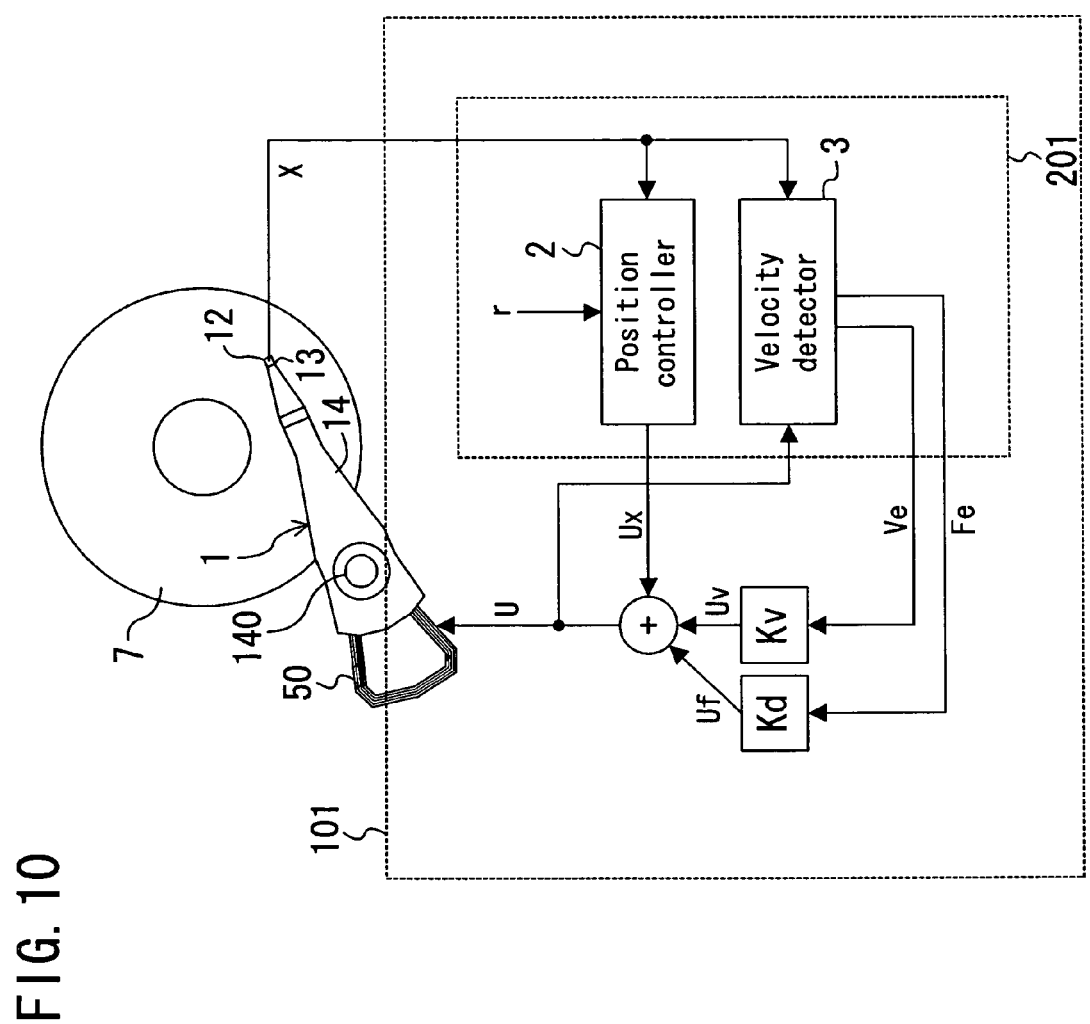
FIG. 10 is a block diagram showing the structure of the head positioning system during the settling control operation according to embodiment 1 of the present invention.

For example, the above-described control may be used in the following control mode, and the structure shown in FIG. 10 may be used in the seek control operation or the settling control operation. In this structure, the force disturbance signal $F_e$ from the velocity detector 3, which is a DC signal, is multiplied by the force disturbance amount feed forward gain $K_d$, whereby the force disturbance control signal $U_f$ is obtained independently of a signal from the counter electromotive voltage detector 4. Moreover, the estimated velocity signal $V_e$ is multiplied by the velocity feedback gain $K_v$ to calculate the velocity control signal $U_v$ without using the estimated velocity corrector 5 and the estimation controller 6.

As described above, in the head positioning system of embodiment 1, disturbance force is estimated in order to suppress an adverse influence of the disturbance force. That is, estimation of disturbance force is performed in order to cancel the disturbance force resulting from friction or vibration as a countermeasure against an adverse influence of static friction on a head moving operation or servo control and deterioration of the positioning precision due to a spindle vibration or external vibration.

In order to realize such a function, an estimator for estimating a head position signal obtained based on the servo information written in the disk 7 and an estimator for estimating a velocity signal based on a counter electromotive voltage signal of an actuator are combined. Thus, the velocity estimated based on the counter electromotive voltage can be corrected using the velocity estimated based on the position signal. Therefore, the estimation precision for estimation of the velocity based on the counter electromotive voltage is improved.

The position signal is a discrete signal, whereas the counter electromotive voltage signal is a continuous signal or a signal whose cycle is shorter than that of the position signal. Thus, positioning is performed with higher frequency as compared with a case where only the position signal is used.

Thus, even in the presence of disturbance due to friction or FPC's reaction force, or spindle vibration disturbance or external vibration disturbance, a positional deviation from a target track due to such disturbance is quickly and precisely corrected.

Furthermore, in the head positioning system of embodiment 1, occurrence of a positional error due to vibration disturbance and an influence of static friction are suppressed. Therefore, such a head positioning system contributes to a size reduction of a disk drive apparatus. Further, it is not necessary to use a special production method or special production element, and therefore, the price of the apparatus is rarely increased.

Next, a variation of embodiment 1 is described.

Figure 11:
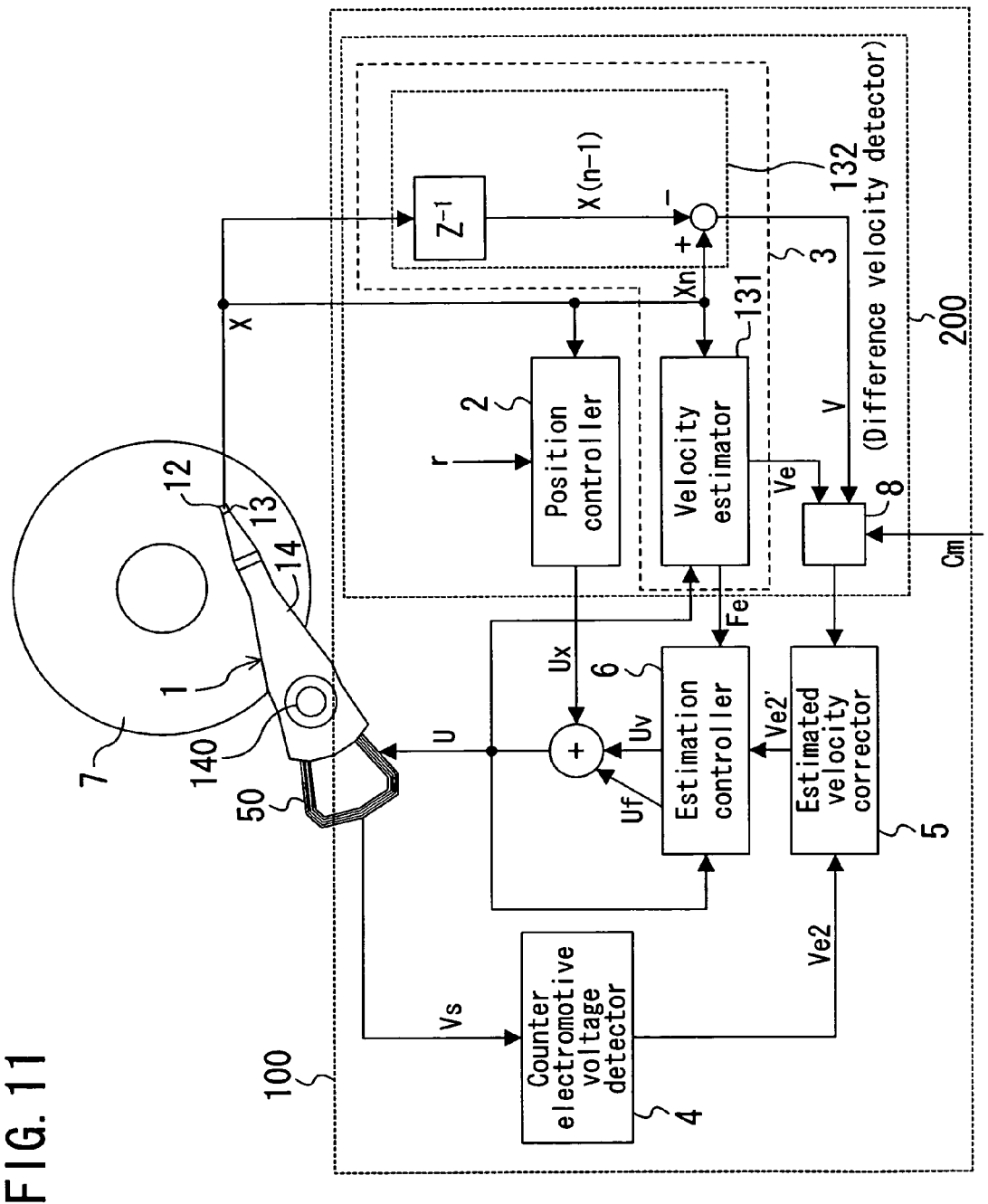
FIG. 11 is a block diagram showing the structure of a variation of the head positioning system.

As shown in FIG. 11, the control section 100 may have a velocity signal switch 8. The velocity signal switch 8 receives the estimated velocity signal $V_e$ and the detected velocity signal v from the velocity detector 3. The detected velocity signal v is obtained by calculating a difference between the detected head position signals x(n) and x(n−1) in the difference velocity detector 132. The velocity signal switch 8 selectively outputs any one of the estimated velocity signal $V_e$ and the detected velocity signal v as a relative velocity signal to the estimated velocity corrector 5. Selection of the signals is performed according to, for example, the mode control signal Cm. Alternatively, the velocity signal switch 8 may output a signal at a cycle shorter than the sampling cycle of the detected head position signal x. In a cycle where the detected head position signal x is input, the velocity signal switch 8 selects the detected velocity signal v generated based on the detected head position signal x. In a cycle where the detected head position signal x is not input, the velocity signal switch 8 selects the estimated velocity signal $V_e$.

Figure 12:
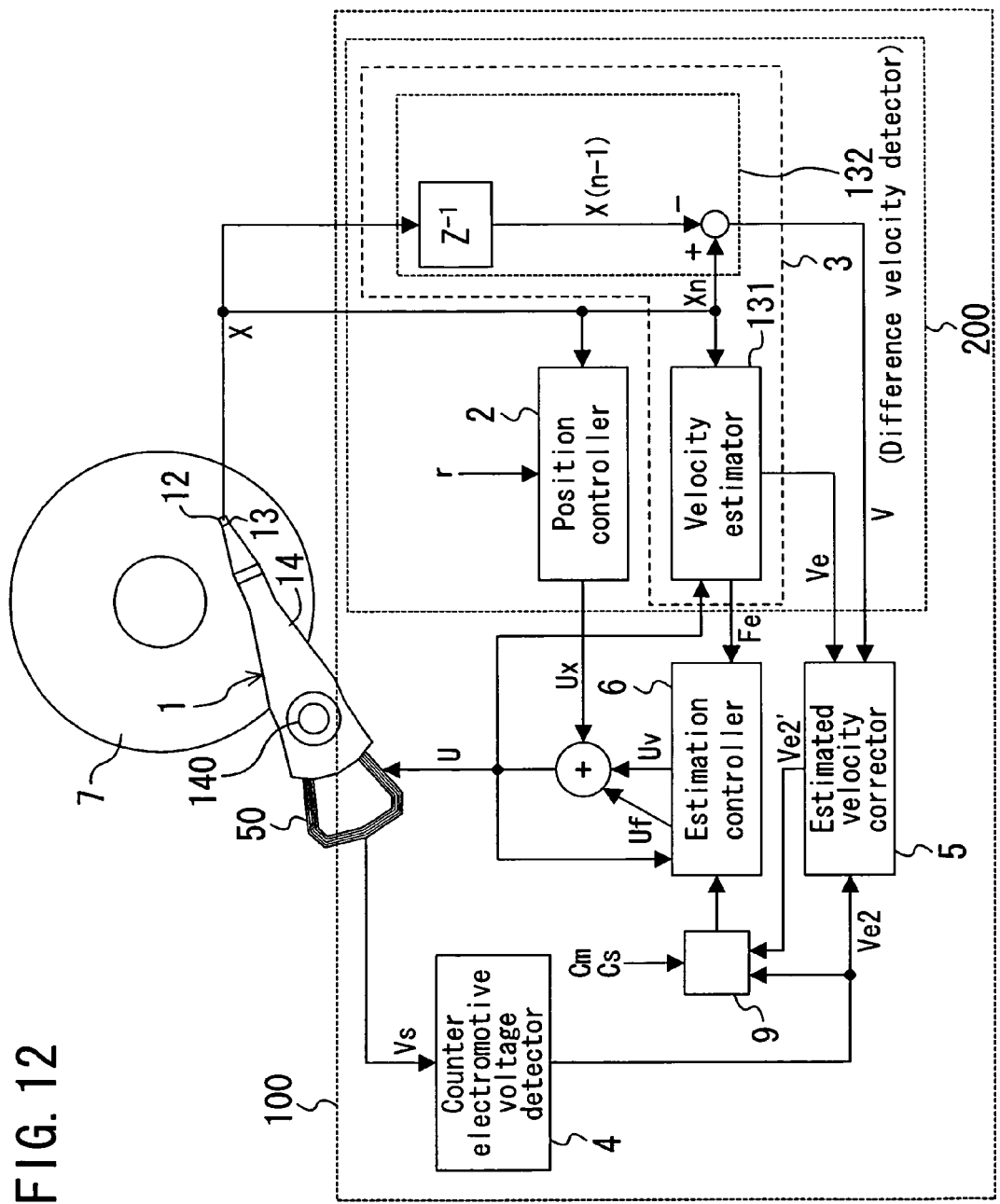
FIG. 12 is a block diagram showing the structure of a variation of the head positioning system.

As shown in FIG. 12, the control section 100 may have an estimated velocity signal switch 9. The estimated velocity signal switch 9 receives the estimated head velocity signal $V_{e2}$ from the counter electromotive voltage detector 4 and the corrected estimated velocity signal $V_{e2}'$ from the estimated velocity corrector 5. The estimated velocity signal switch 9 selectively outputs any one of the estimated head velocity signal $V_{e2}$ and the corrected estimated velocity signal $V_{e2}'$ to the estimation controller 6. Selection of the signals is performed according to, for example, the mode control signal Cm or a sensor signal Cs (for example, a signal from a G-sensor).

(Embodiment 2)

Figure 13:
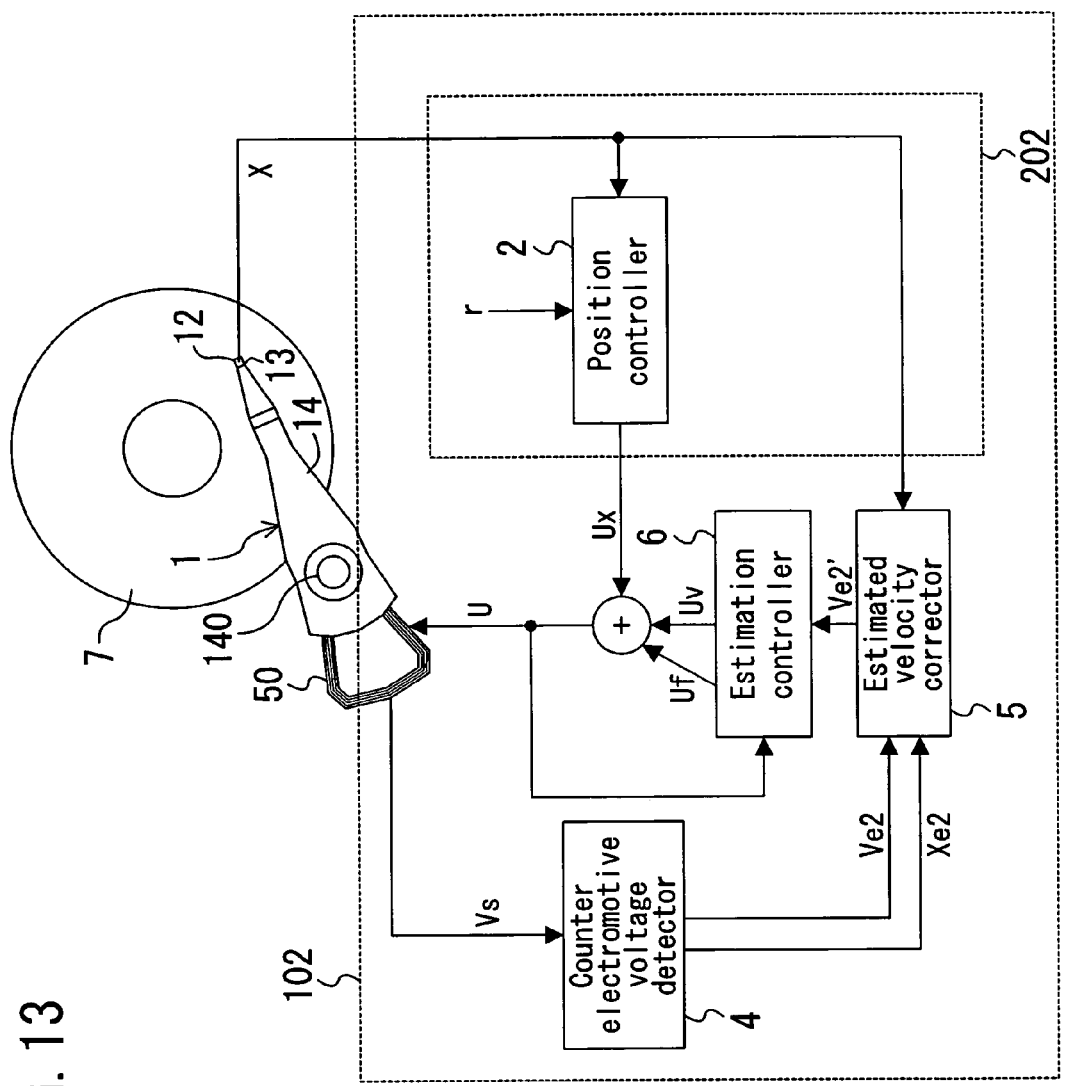
FIG. 13 is a block diagram showing the structure of a head positioning system according to embodiment 2 of the present invention.

FIG. 13 is a block diagram showing the structure of a head positioning system according to embodiment 2 of the present invention.

In FIG. 13, the structure of the mechanism of a control section 102 is the same as that of embodiment 1, and therefore, description thereof is herein omitted. In FIG. 13 of embodiment 2, like elements are denoted by like reference numerals used in embodiment 1.

However, a basic control section 202 included in the control section 102 is different from the basic control section 200 of embodiment 1 in that it is not necessary to provide the velocity detector 3 in the basic control section 202. The detected head position signal x is directly input to the estimated velocity corrector 5. Furthermore, embodiment 2 is difference from embodiment 1 in that the estimated head velocity signal $V_{e2}$ and an estimated head transfer position signal $x_{e2}$ obtained by integrating the estimated head velocity signal $V_{e2}$ are generated in the counter electromotive voltage detector 4 based on a continuous (analog) signal from the actuator 50 including driving means, such as a VCM, or the like. The estimated velocity corrector 5 receives the detected head position signal x, the estimated head velocity signal $V_{e2}$ and the estimated head transfer position signal $x_{e2}$. The estimated velocity corrector 5 obtains a correction amount from the difference between the detected head position signal x and the estimated head transfer position signal $x_{e2}$ and corrects the estimated head velocity signal $V_{e2}$ based on the correction amount to output the corrected estimated velocity signal $V_{e2}'$. A method for obtaining the control amount signal U by adding together the velocity control signal $U_v$ and the force disturbance control signal $U_f$, which are generated by the estimation controller 6 based on the corrected estimated velocity signal $V_{e2}'$, and the previous position control signal $U_x$ from the position controller 2 is the same as that described in embodiment 1.

Embodiment 2 also achieves the same effects as those of embodiment 1.

(Embodiment 3)

Figure 14:
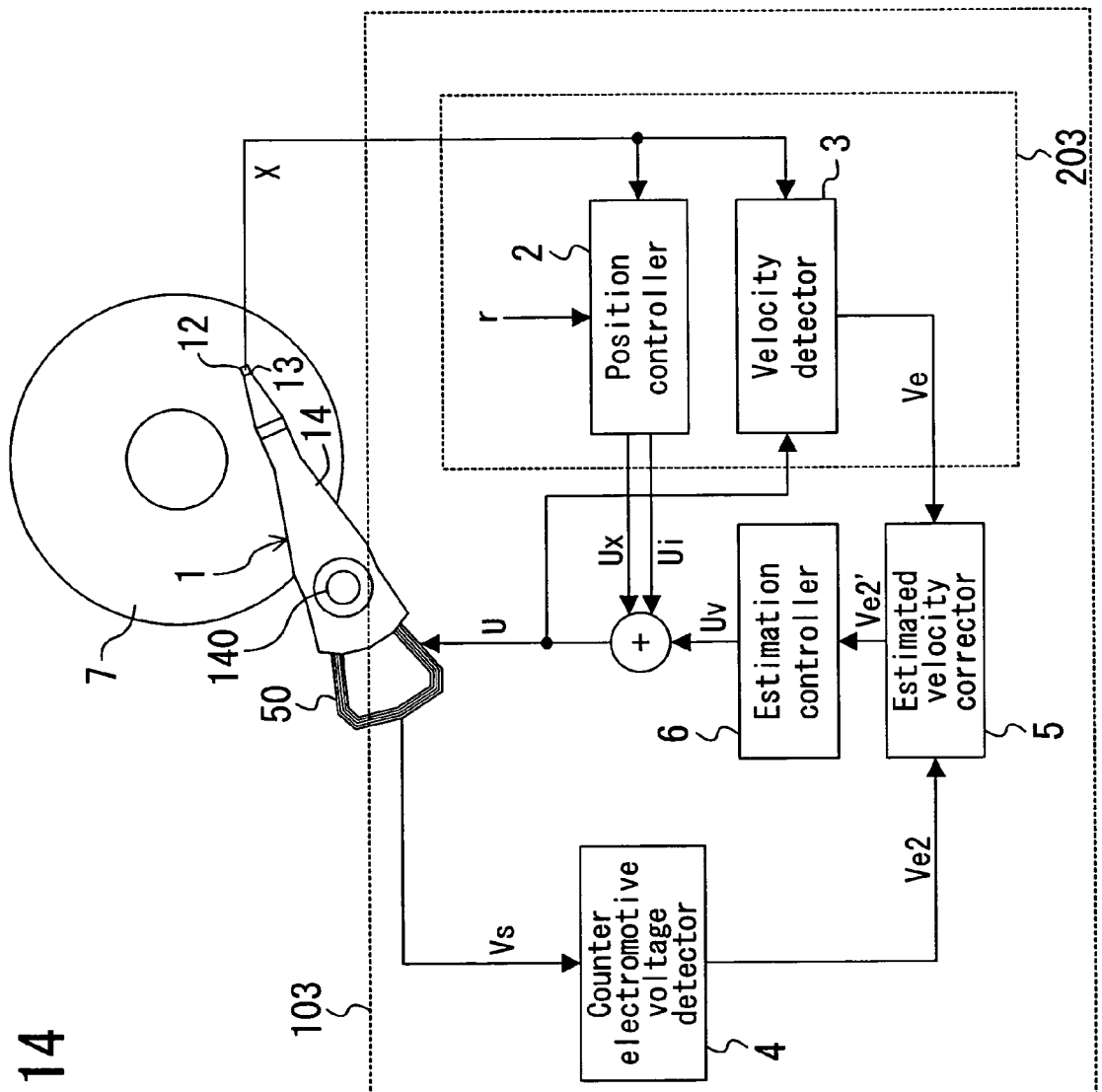
FIG. 14 is a block diagram showing the structure of a head positioning system according to embodiment 3 of the present invention.

FIG. 14 is a block diagram showing the structure of a head positioning system according to embodiment 3 of the present invention.

In FIG. 14, the structure of the mechanism of the control section 103 is the same as those of embodiments 1 and 2, and therefore, description thereof is herein omitted. Further, like elements are denoted by like reference numerals used in FIG. 1 of embodiment 1.

Embodiment 2 is different from embodiment 1 in that, in the control section 103, the estimation controller 6 receives only the corrected estimated velocity signal $V_{e2}'$, and the control amount signal U is not fed back to the estimation controller 6. The estimation controller 6 multiplies the corrected estimated velocity signal $V_{e2}'$ by the velocity feedback gain $K_v$ to output the velocity control signal $U_v$.

A position controller 2 included in a basic control section 203 multiplies the position error signal e, which is a difference between the detected head position signal x and the target head position signal r, by the position error feedback gain $K_p$ to generate the position control signal $U_x$. The position controller 2 further multiplies a signal obtained by integrating the position error signal e by a position error integrated feedback gain $K_i$ to generate a position error integration control signal $U_i$. Thus, in embodiment 3, the control amount signal U is obtained based on the velocity control signal $U_v$ from the estimation controller 6 and the position control signal $U_x$ and the position error integration control signal $U_i$ from the basic control section 203 without using the force disturbance control signal $U_f$.

Thus, in the head positioning system of embodiment 3, the control frequency is increased by a feedback process performed based on the estimated velocity. Furthermore, integral compensation is performed in order to cancel disturbance force caused by friction or vibration.

Embodiment 3 also achieves the same effects as those of embodiment 1.

(Embodiment 4)

Figure 15:
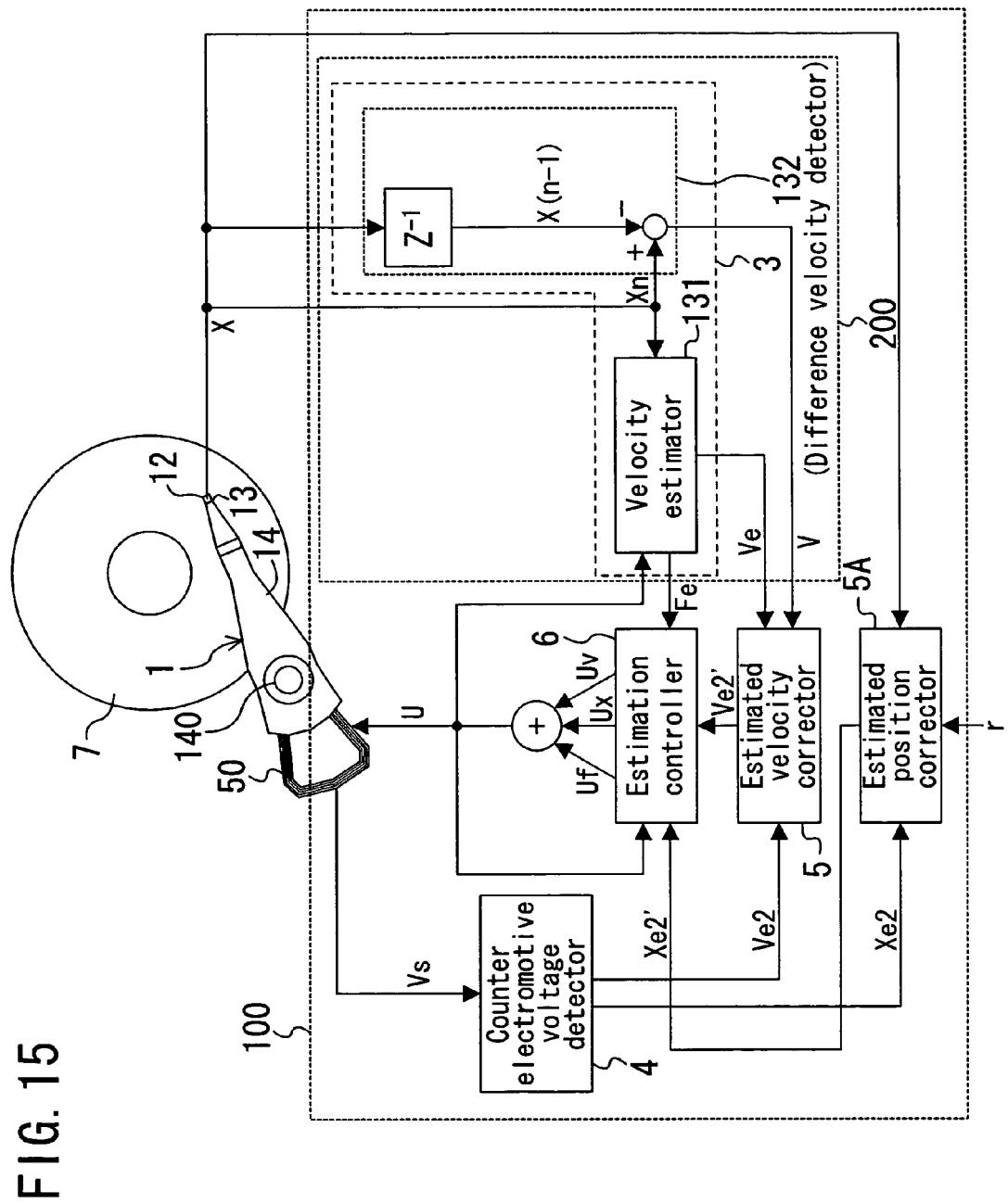
FIG. 15 is a block diagram showing the structure of a head positioning system according to embodiment 4 of the present invention.
Figure 16:
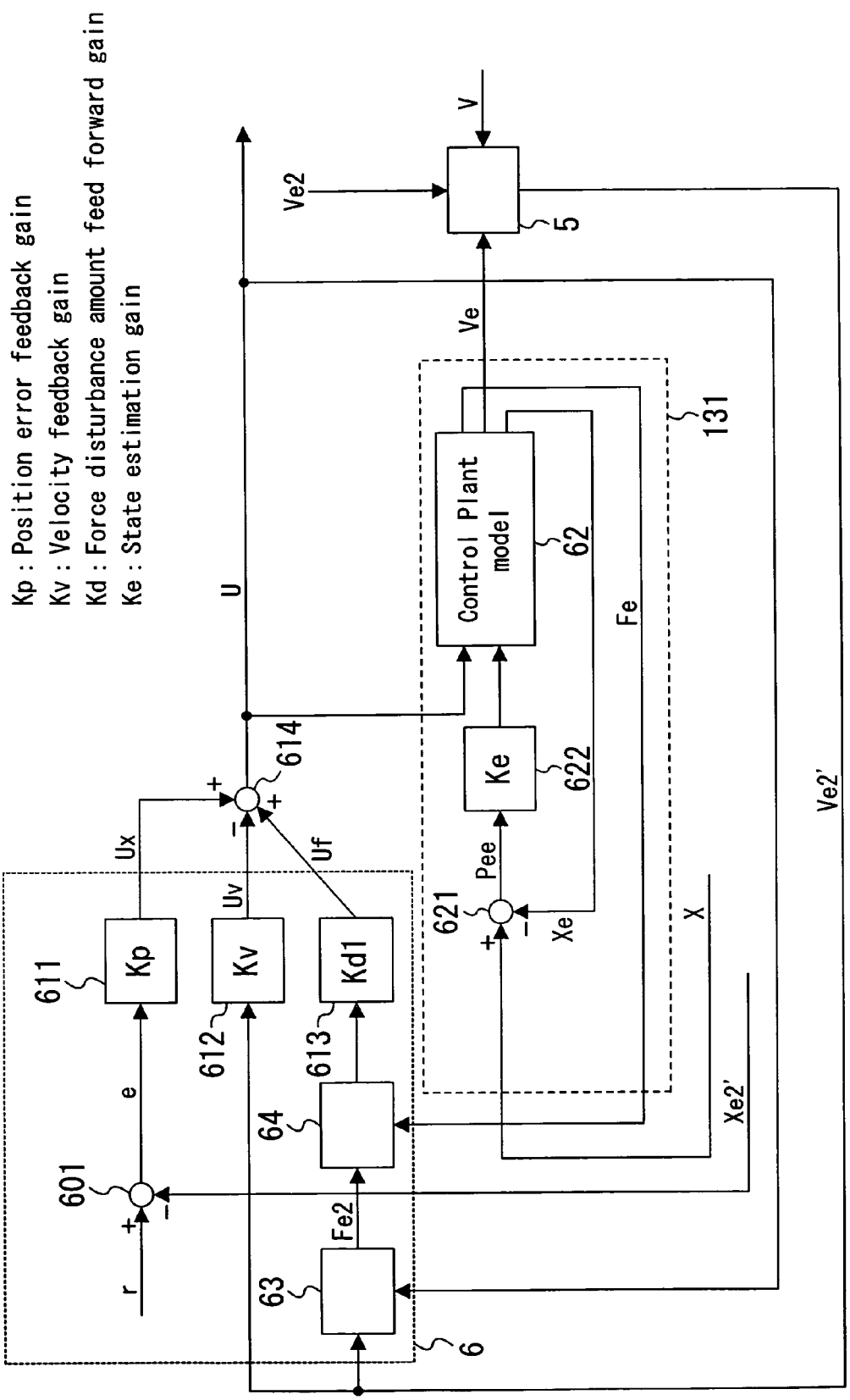
FIG. 16 is a block diagram showing the structure of a principal part of a basic control section according to embodiment 4 of the present invention.
Figure 17:
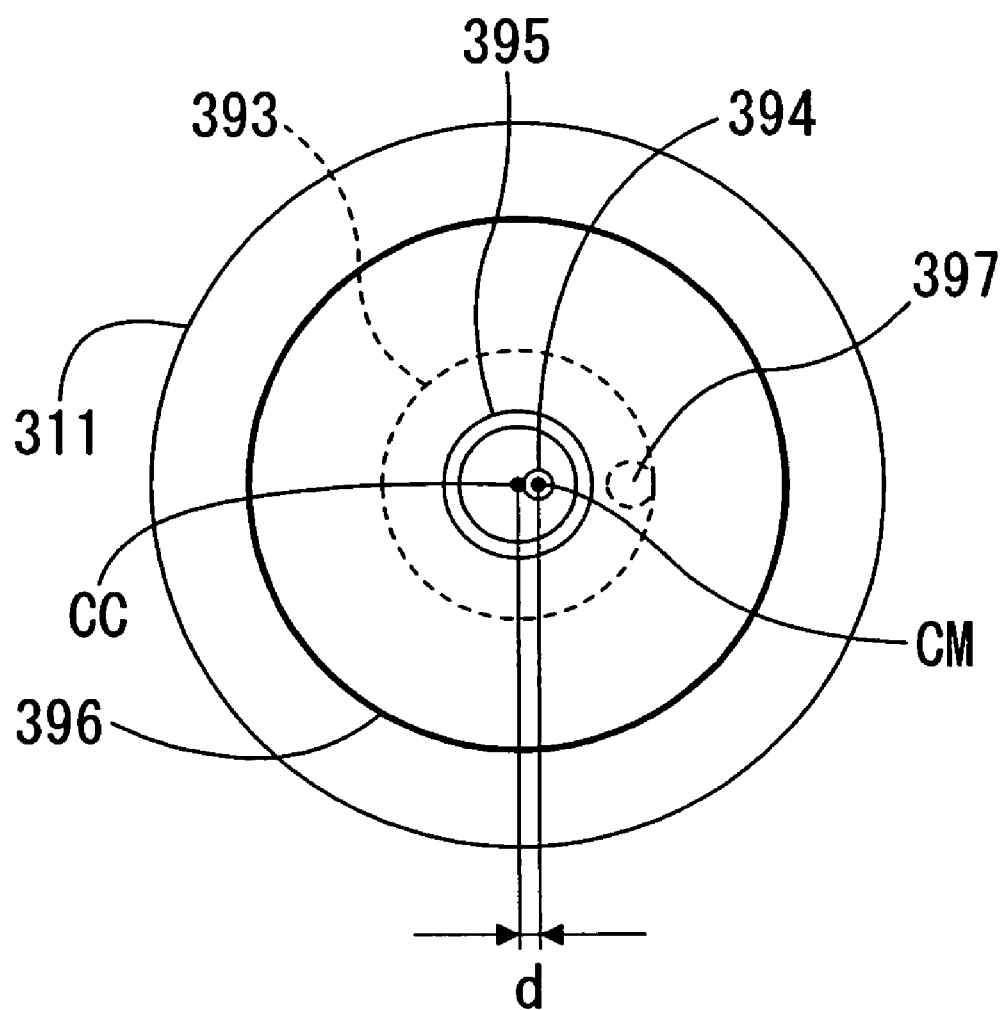
FIG. 17 illustrates an operation principle of a head positioning system of a conventional disk drive apparatus.
Figure 18:
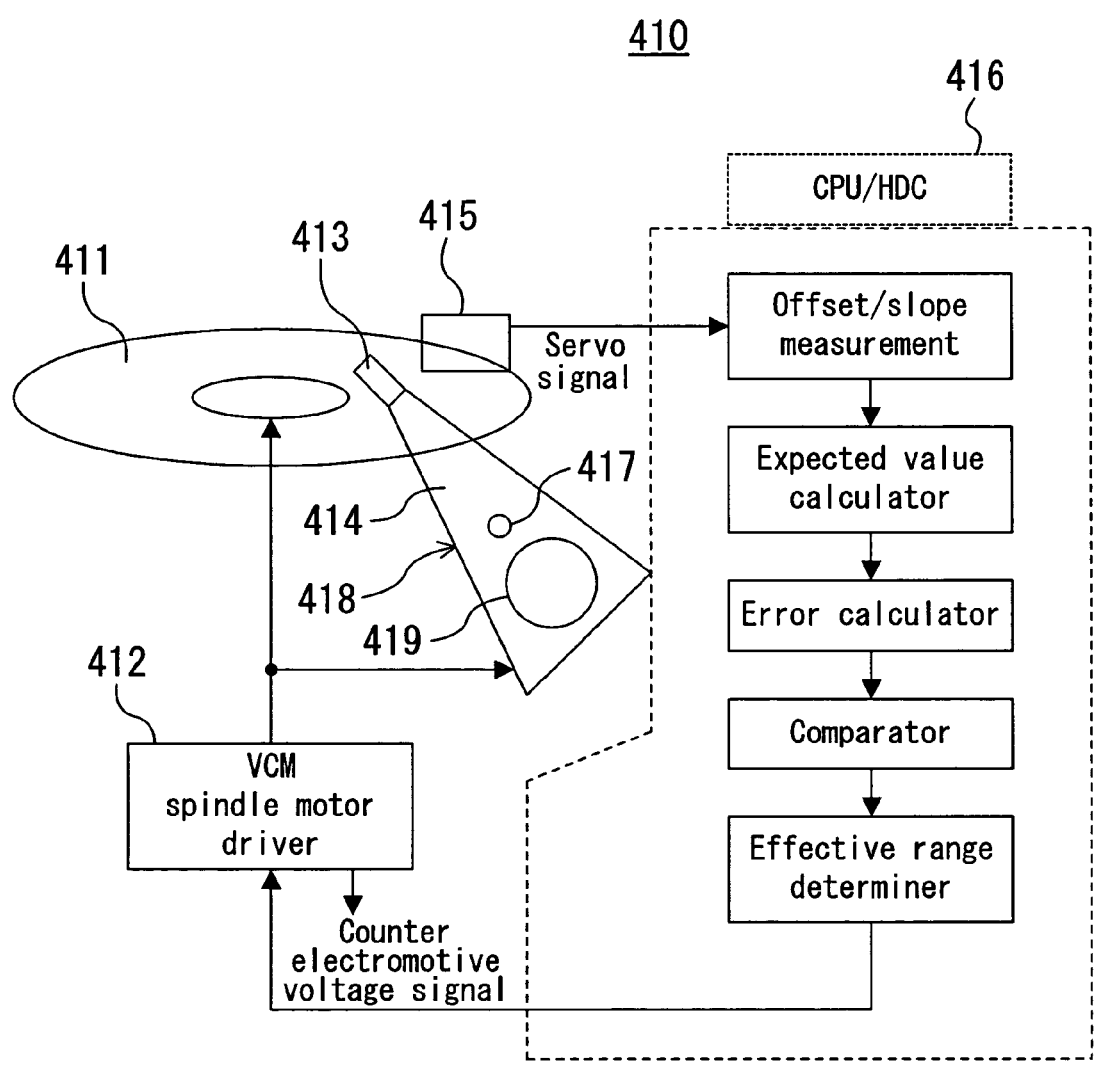
FIG. 18 is a block diagram showing the structure of another example of the head positioning system of the conventional disk drive apparatus.
Figure 19B:
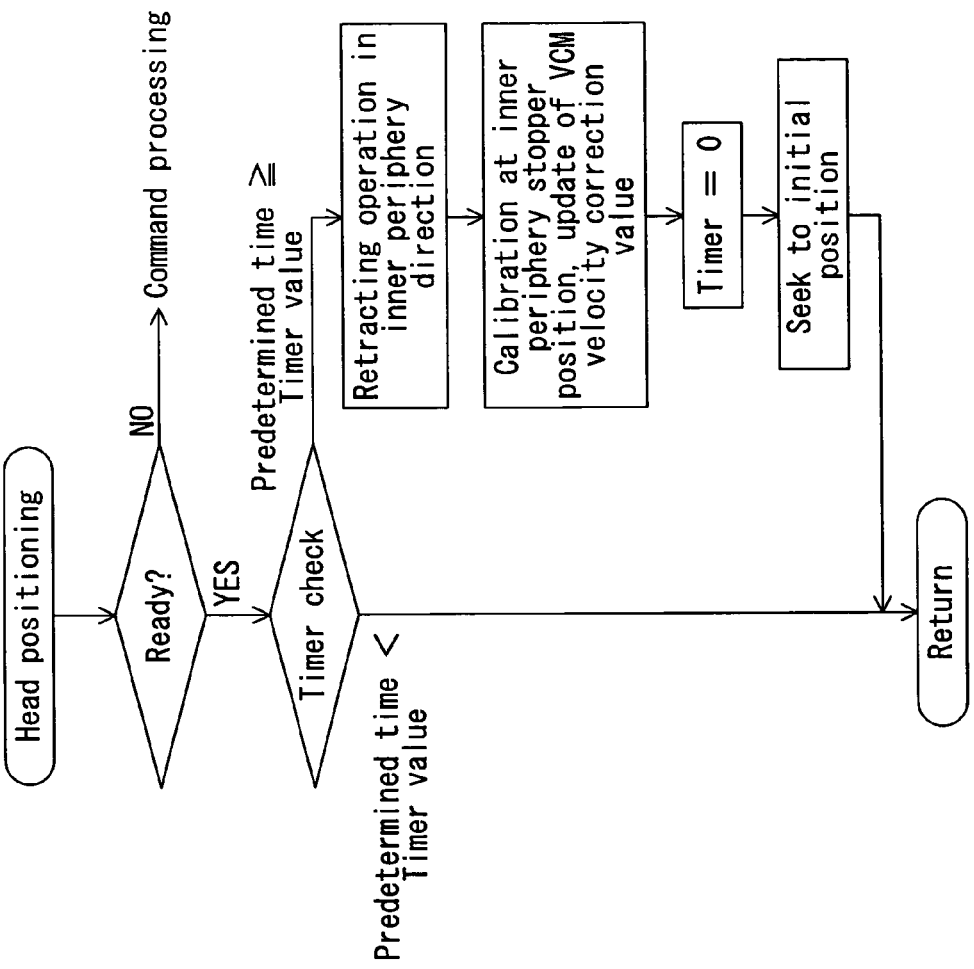
FIGS. 19A and 19B are flowcharts illustrating the operation of another example of the head positioning system of the conventional disk drive apparatus.
Figure 19A:
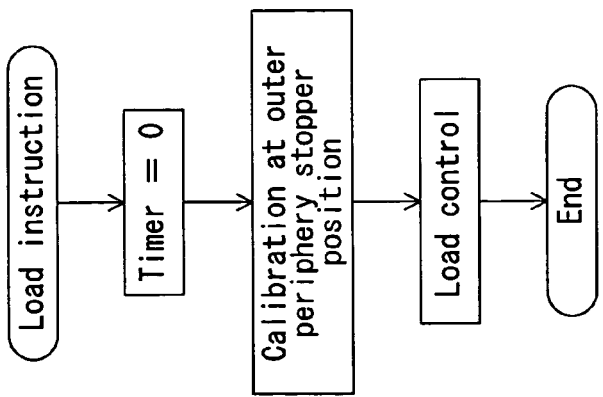

FIG. 15 is a block diagram showing the structure of a head positioning system according to embodiment 4 of the present invention. FIG. 16 is a block diagram showing a principal part of a control section 104.

As shown in FIG. 15, according to embodiment 4, the control section 104 further includes an estimated position corrector 5A. The estimated position corrector 5A receives the estimated head transfer position signal $x_{e2}$ from the counter electromotive voltage detector 4, the detected head position signal x, and a target head position signal r. The estimated position corrector 5A corrects an estimation error of the estimated head transfer position signal $x_{e2}$ based on a difference between the detected head position signal x and the estimated head transfer position signal $x_{e2}$ to output a corrected estimated head position signal $x_{e2}'$. The corrected estimated head position signal $x_{e2}'$ is input to the estimation controller 6.

The estimation controller 6 calculates the force disturbance control signal $U_f$, the position control signal $U_x$ and the velocity control signal $U_v$ based on the corrected estimated velocity signal $V_{e2}'$, the corrected estimated head position signal $x_{e2}'$ and the control amount signal U.

Embodiment 4 also achieves the same effects as those of embodiment 1.

(Other Embodiments)

In the above embodiments, the correction amount is derived based on the difference between an estimated absolute velocity and an estimated relative velocity. However, the same effects can be obtained even when the correction amount is derived based on the ratio between the estimated absolute velocity and the estimated relative velocity.

In the above embodiments, the correction amount is an average of 10 measurement values. However, as a matter of course, the correction amount may be an average of the other number of measurement values.

In the above embodiments, the number of samplings of the estimated relative velocity is twice the number of samplings of the position information. However, the number of samplings of the estimated relative velocity may be equal to the number of samplings of the position information, or may be larger than the number of samplings of the position information by a factor of 3 or more.

The disk drive apparatus is not limited to a magnetic disk drive apparatus, but may be any other type of disk drive apparatus, such as an optical disk drive apparatus, or the like.

As described above, the present invention is useful for a disk drive apparatus, such as a magnetic disk drive apparatus, an optical disk drive apparatus, or the like, and for a head positioning system of the disk drive apparatus.

What is claimed is:

1. A head positioning system for positioning a head, which at least reads information from a rotating disk-shaped information recording medium containing at least servo information, to a target head position on the information recording medium, the head positioning system comprising:

an actuator including a voice coil motor for moving the head;

a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal;

a velocity detector for receiving the head position signal, and detecting or estimating a relative velocity of the head with respect to the information recording medium to output a relative velocity signal that indicates a relative velocity of the head;

a counter electromotive voltage detector for detecting a counter electromotive voltage signal of the voice coil motor of the actuator, and estimating an absolute velocity of the head based on the counter electromotive voltage signal to output an estimated head velocity signal;

an estimated velocity corrector for correcting an estimation error of the estimated head velocity signal based on the relative velocity signal to output a corrected estimated velocity signal; and an estimation controller for outputting a velocity control signal based on the corrected estimated velocity signal, wherein the actuator is controlled by a control amount signal that is obtained by adding together at least the position control signal and the velocity control signal.

2. The head positioning system of claim 1, wherein:

the estimation controller estimates an external disturbance based on the corrected estimated velocity signal and the control amount signal to output a force disturbance control signal; and the control amount signal is obtained by adding together the force disturbance control signal, the velocity control signal and the position control signal.

3. The head positioning system of claim 2, wherein:

the velocity detector assumes that the disturbance is represented by a stepped waveform and estimates the disturbance based on the head position signal and the control amount signal to output an estimated disturbance signal; and the estimation controller generates the force disturbance control signal based on the estimated disturbance signal.

4. The head positioning system of claim 2, wherein:

the position control signal is a discrete signal; and the velocity control signal and the force disturbance control signal are continuous signals which vary during the time when the position control signal takes a constant value or discrete signals whose frequencies are higher than that of the position control signal.

5. The head positioning system of claim 1, wherein:
the velocity detector and the counter electromotive voltage detector output the relative velocity signal and the estimated head velocity signal, respectively, at periodic or non-periodic intervals; and
the estimated velocity corrector corrects an estimation error of the estimated head velocity signal from the counter electromotive voltage detector based on an average of the difference or ratio between n samples of the relative velocity signal which are detected by the velocity detector and n samples of the estimated head velocity signal which are detected by the counter electromotive voltage detector (where n is a natural number).

6. The head positioning system of claim 1, wherein:
the estimated velocity corrector makes a correction to an estimation error of the estimated head velocity signal at a predetermined cycle;
in a cycle where the relative velocity signal is input, the estimated velocity corrector calculates a new correction amount to make a correction to the estimation error; and
in a cycle where the relative velocity signal is not input, the estimated velocity corrector uses a previous correction amount to make a correction to the estimation error.

7. The head positioning system of claim 6, wherein:
the velocity detector detects or estimates the velocity of the head at a predetermined sampling cycle; and
the estimated velocity corrector corrects an estimation error of the estimated head velocity signal at a cycle equal to or shorter than a ½ of the sampling cycle.

8. The head positioning system of claim 1, wherein:
the counter electromotive voltage detector has an analog-digital converter whose dynamic range is freely switchable or a plurality of analog-digital converters having different dynamic ranges; and
the counter electromotive voltage detector switches the dynamic range according to a control operation mode of the head.

9. A disk drive apparatus comprising:
a disk-shaped information recording medium containing at least servo information;
a rotation control mechanism for rotating the information recording medium;
a head for at least reading information from the information recording medium; and
a head positioning system for positioning the head to a target head position on the information recording medium,
wherein the head positioning system includes:
an actuator including a voice coil motor for moving the head;
a position controller for receiving a head position signal which is generated by reading the servo information with the head and indicates the position of the head and a target head position signal which indicates the target head position, generating a position error signal that is a difference between the head position signal and the target head position signal, and outputting a position control signal based on the position error signal;
a velocity detector for receiving the head position signal, and detecting or estimating a relative velocity of the head with respect to the information recording medium to output a relative velocity signal that indicates a relative velocity of the head;
a counter electromotive voltage detector for detecting a counter electromotive voltage signal of the voice coil motor of the actuator, and estimating an absolute velocity of the head based on the counter electromotive voltage signal to output an estimated head velocity signal;
an estimated velocity corrector for correcting an estimation error of the estimated head velocity signal based on the relative velocity signal to output a corrected estimated velocity signal; and
an estimation controller for outputting a velocity control signal based on the corrected estimated velocity signal,
wherein the actuator is controlled by a control amount signal that is obtained by adding together at least the position control signal and the velocity control signal.

10. A head positioning method for positioning a head, which at least reads information from a rotating disk-shaped information recording medium containing at least servo information, to a target head position on the information recording medium using an actuator including a voice coil motor for moving the head, the head positioning method comprising the steps of:
generating, from a head position signal which is generated by reading the servo information with the head and indicates the position of the head and a target head position signal which indicates the target head position, a position error signal that is a difference between the head position signal and the target head position signal, and outputting a position control signal based on the position error signal;
detecting or estimating a relative velocity of the head with respect to the information recording medium based on the head position signal to output a relative velocity signal that indicates a relative velocity of the head;
detecting a counter electromotive voltage signal of the voice coil motor of the actuator, and estimating an absolute velocity of the head based on the counter electromotive voltage signal to output an estimated head velocity signal;
correcting an estimation error of the estimated head velocity signal based on the relative velocity signal to output a corrected estimated velocity signal;
outputting a velocity control signal based on the corrected estimated velocity signal; and
controlling the actuator by a control amount signal that is obtained by adding together at least the position control signal and the velocity control signal.

* * * * *